US005528429A

United States Patent [19] [11] Patent Number: 5,528,429
Hagimori [45] Date of Patent: Jun. 18, 1996

[54] HIGH-MAGNIFICATION ZOOM LENS SYSTEM

[75] Inventor: Hitoshi Hagimori, Nara-ken, Japan

[73] Assignee: Minolta Camara Kabushiki Kaisha, Osaka, Japan

[21] Appl. No.: 105,606

[22] Filed: Aug. 12, 1993

[30] Foreign Application Priority Data

Aug. 20, 1992 [JP] Japan ..................................... 4-221491

[51] Int. Cl.$^6$ ............................. G02B 15/14; G02B 13/18
[52] U.S. Cl. ............................ 359/689; 359/708; 359/713
[58] Field of Search .................................... 359/689, 713, 359/708

[56] References Cited

U.S. PATENT DOCUMENTS

| | | | |
|---|---|---|---|
| 4,978,204 | 12/1990 | Ito | 359/689 |
| 4,983,027 | 1/1991 | Kojima et al. | 359/689 |
| 5,033,832 | 7/1991 | Ito | 359/687 |
| 5,069,536 | 12/1991 | Ogata | 359/689 |
| 5,196,962 | 3/1993 | Aoki | 359/689 |
| 5,260,833 | 11/1993 | Ito et al. | 359/689 |
| 5,343,329 | 8/1994 | Ito | 359/689 |
| 5,424,871 | 6/1995 | Ito et al. | 359/689 |

FOREIGN PATENT DOCUMENTS 3-39921  2/1991  Japan .

*Primary Examiner*—Scott J. Sugarman
*Attorney, Agent, or Firm*—Price, Gess, & Ubell

[57] ABSTRACT

A zoom lens system has, from the object side to the image side, a first lens unit of positive power, a second lens unit of positive power and a third lens unit of negative power. Each lens unit has two lens elements. The air space between the first and second lens units and the air space between the second and third lens units are varied during a zooming operation. The zoom lens system fulfills the following condition:

$$2.5 < \frac{f1}{fW} < 12$$

Here, f1 is a focal length of the first lens unit and fW is a focal length of the entire lens system at the shortest focal length condition.

7 Claims, 16 Drawing Sheets

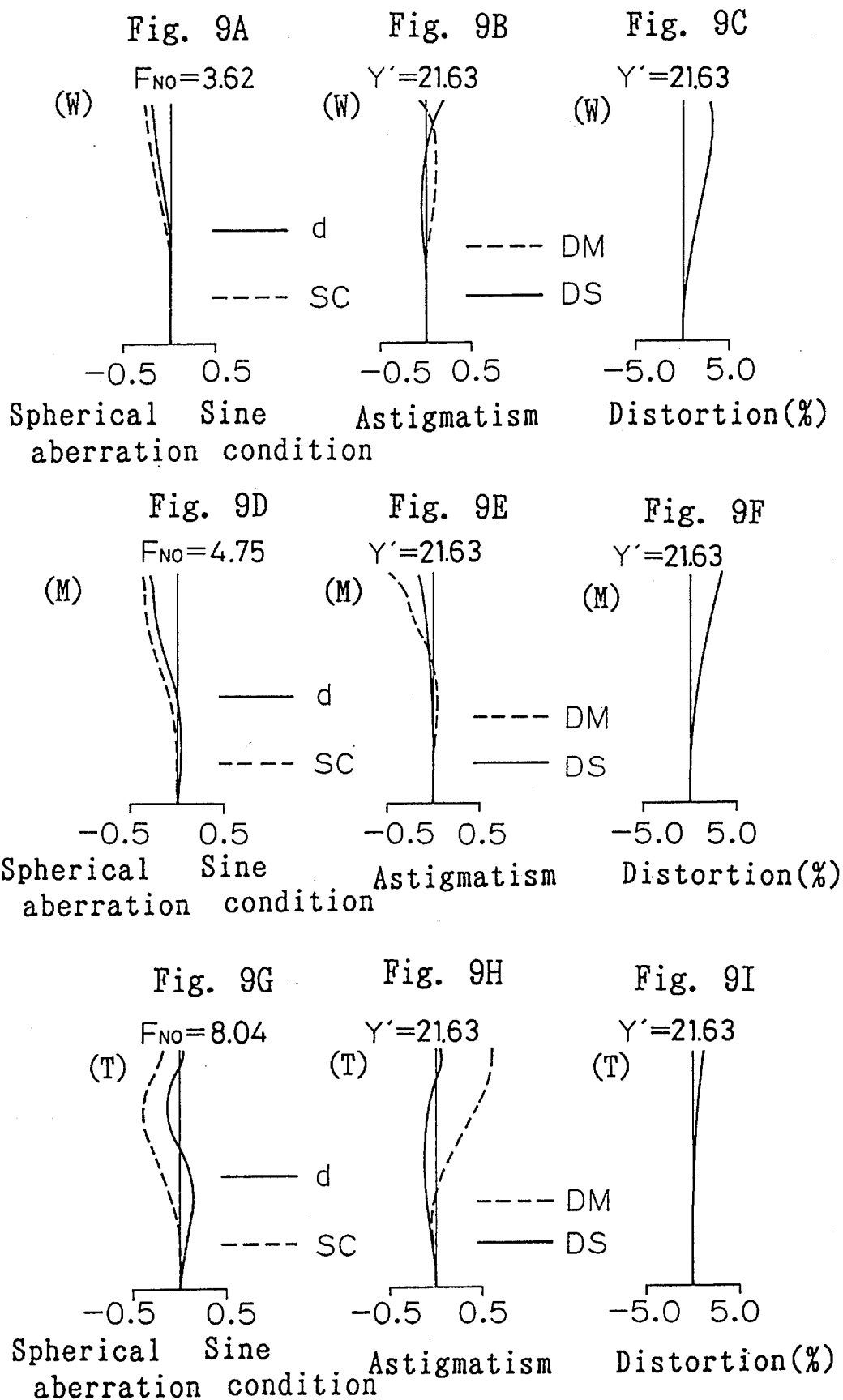

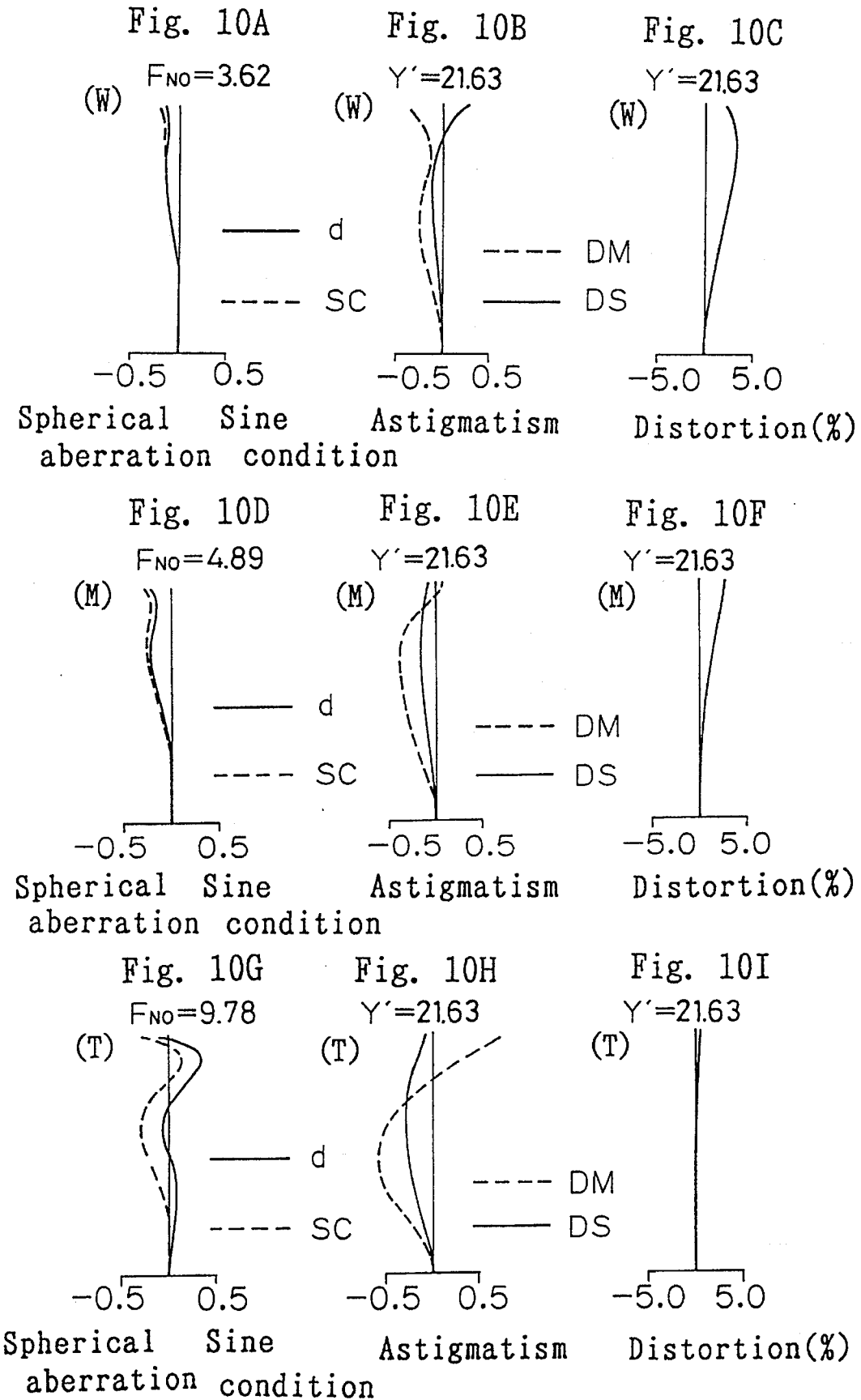

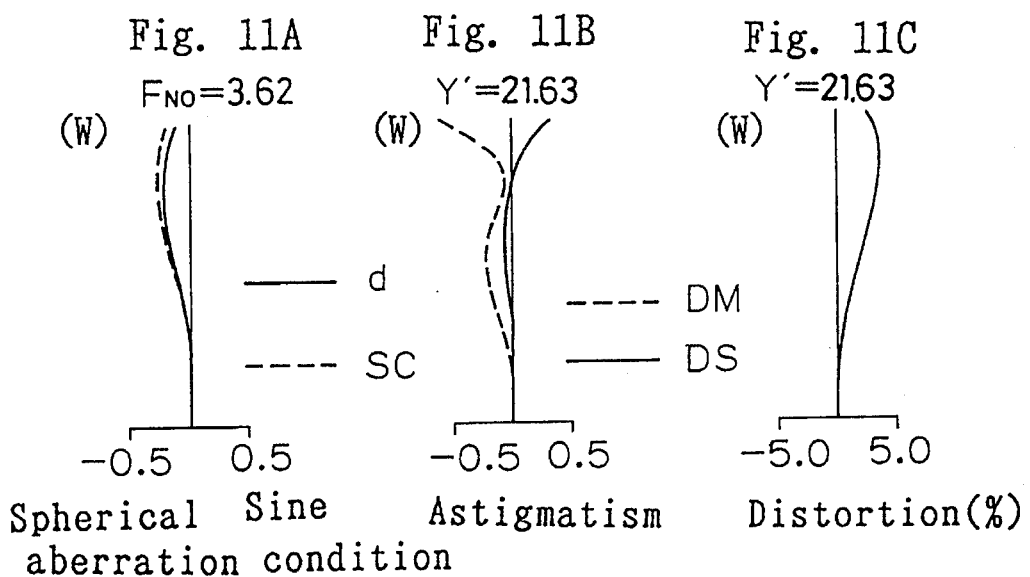
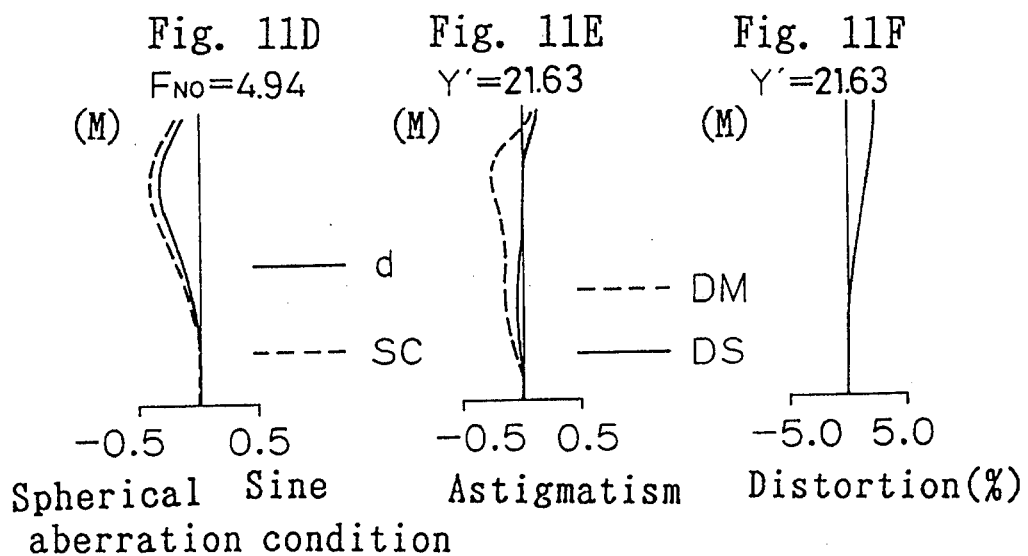
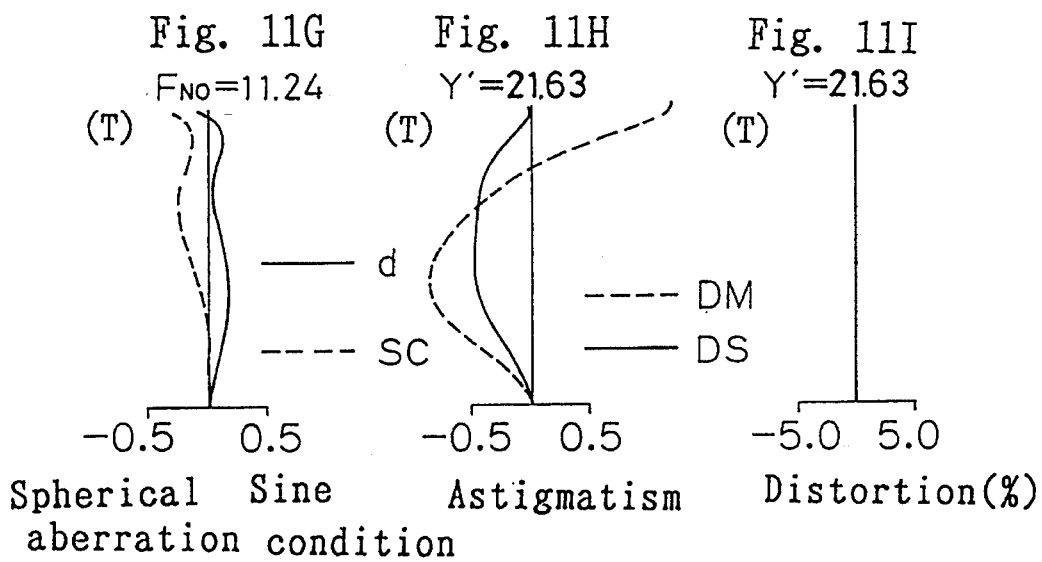

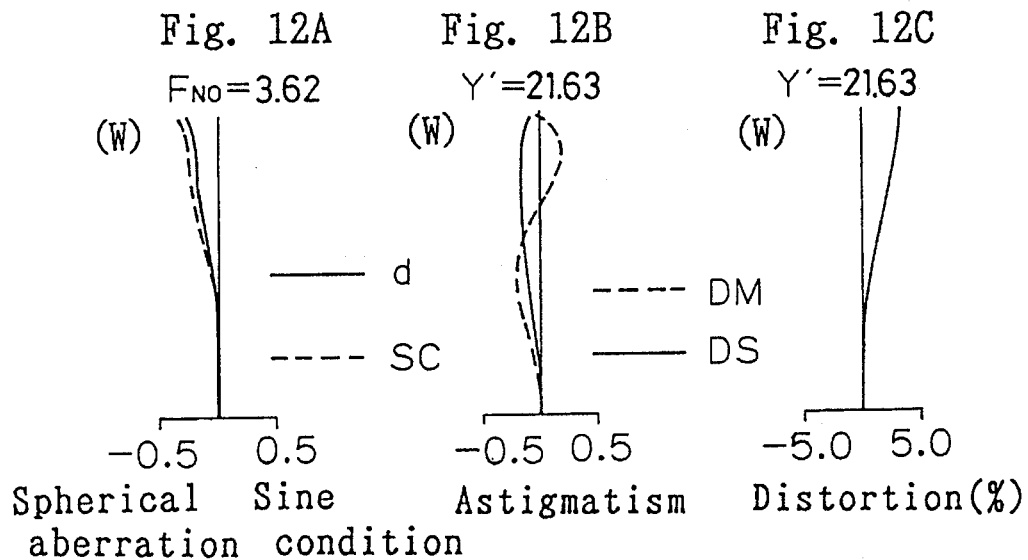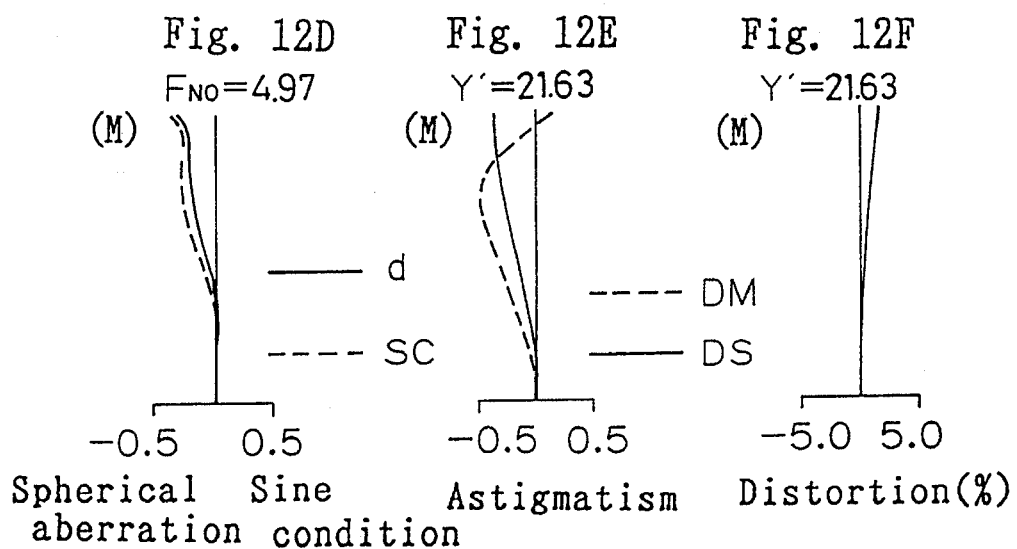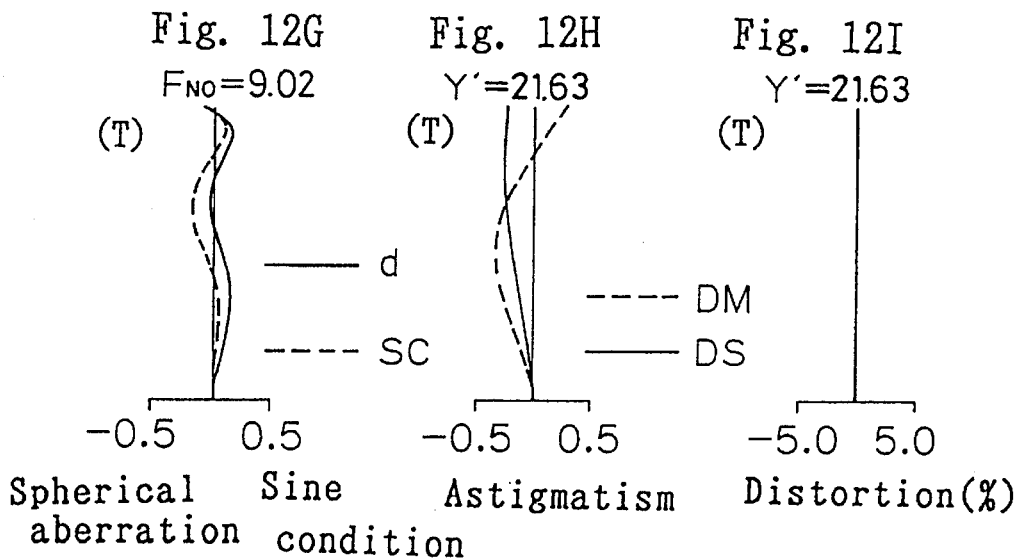

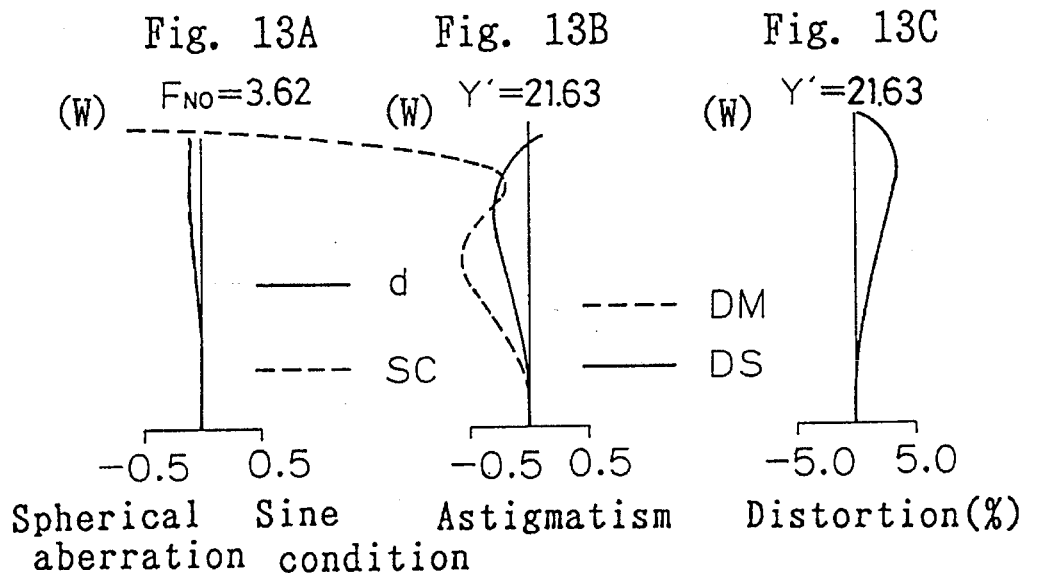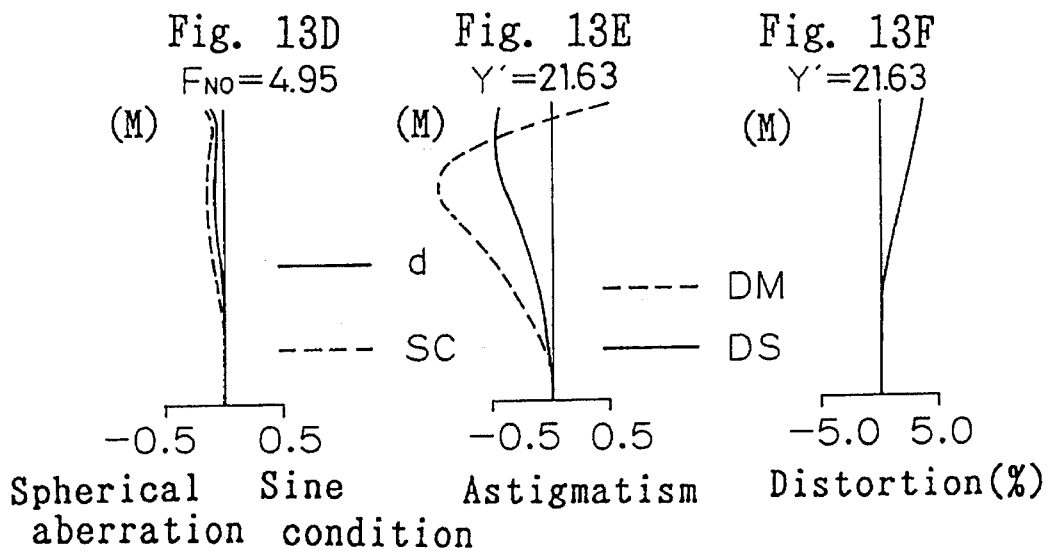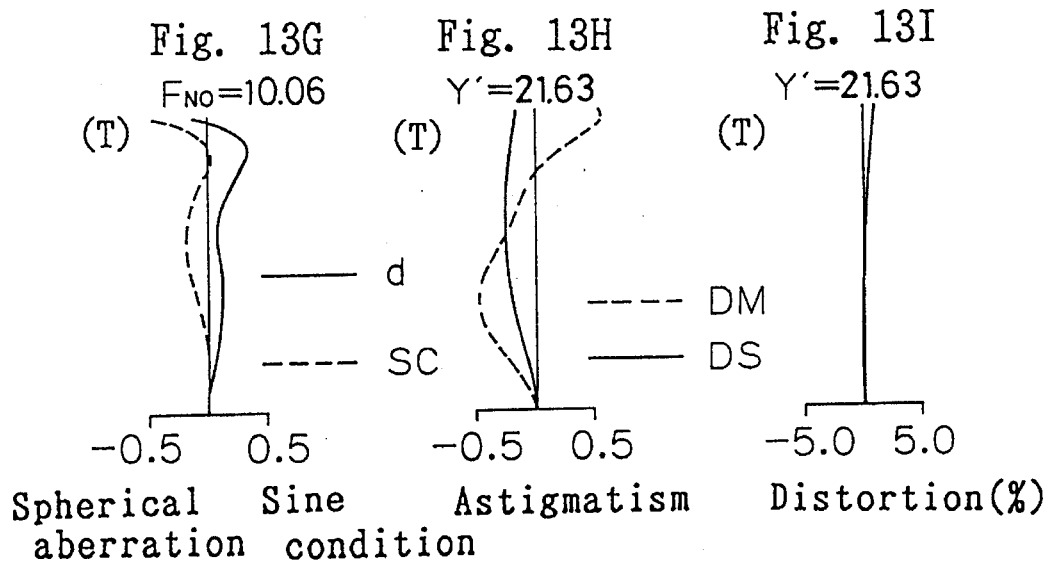

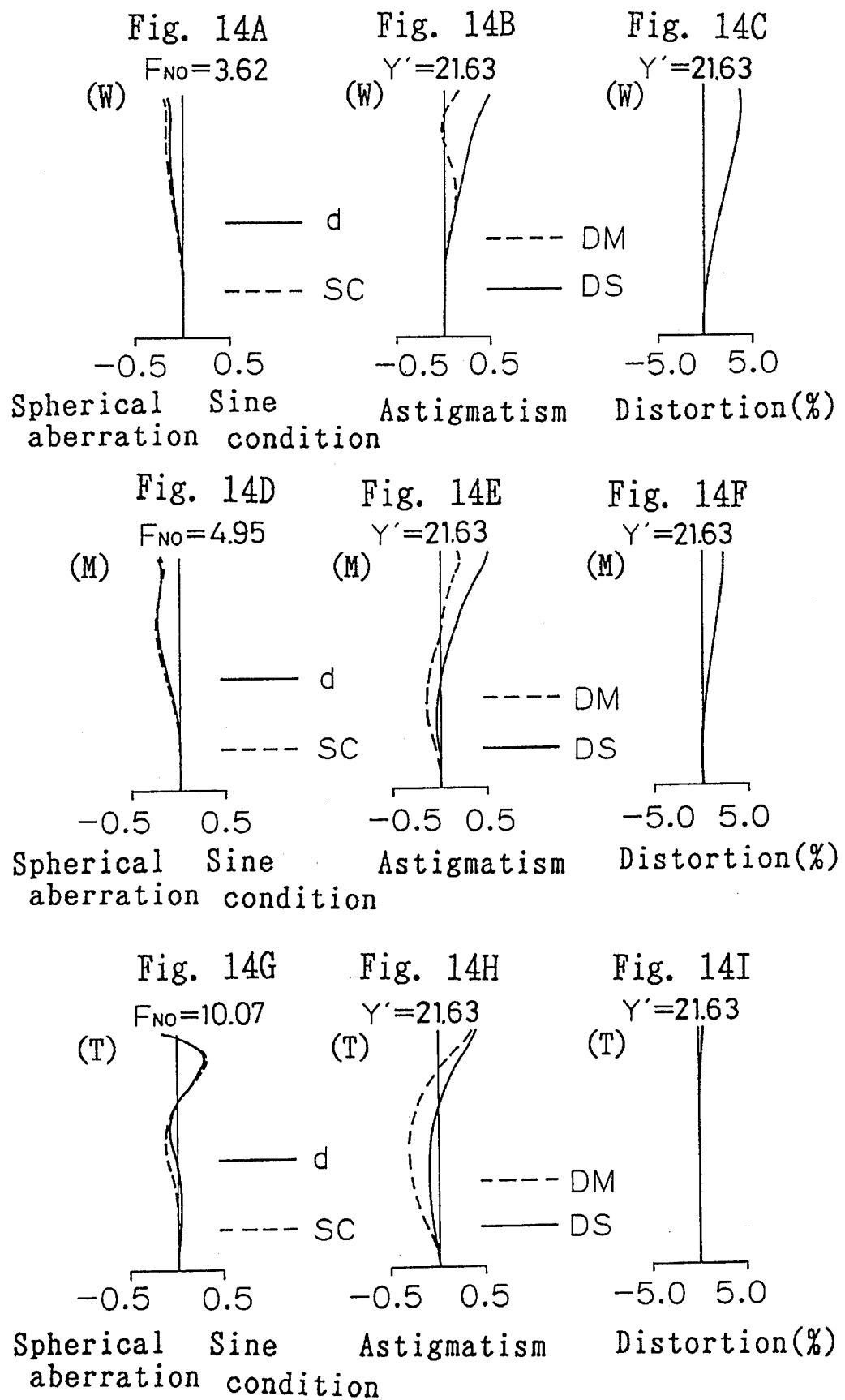

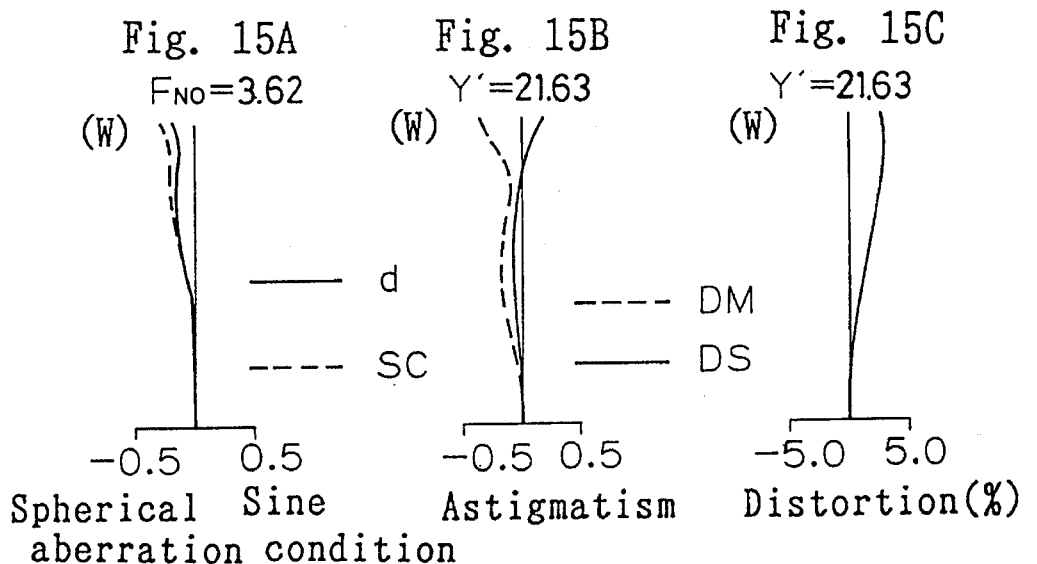
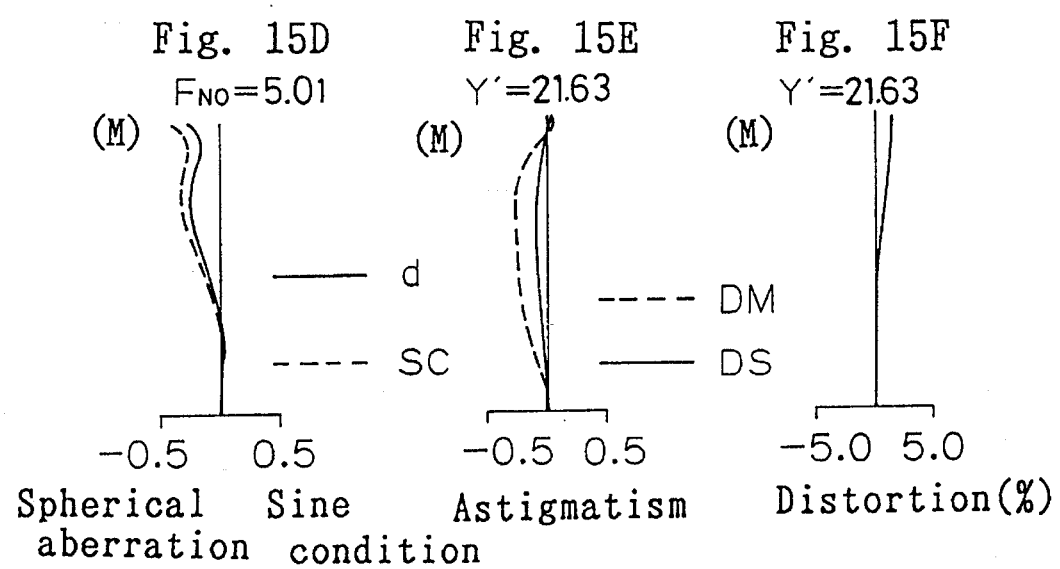
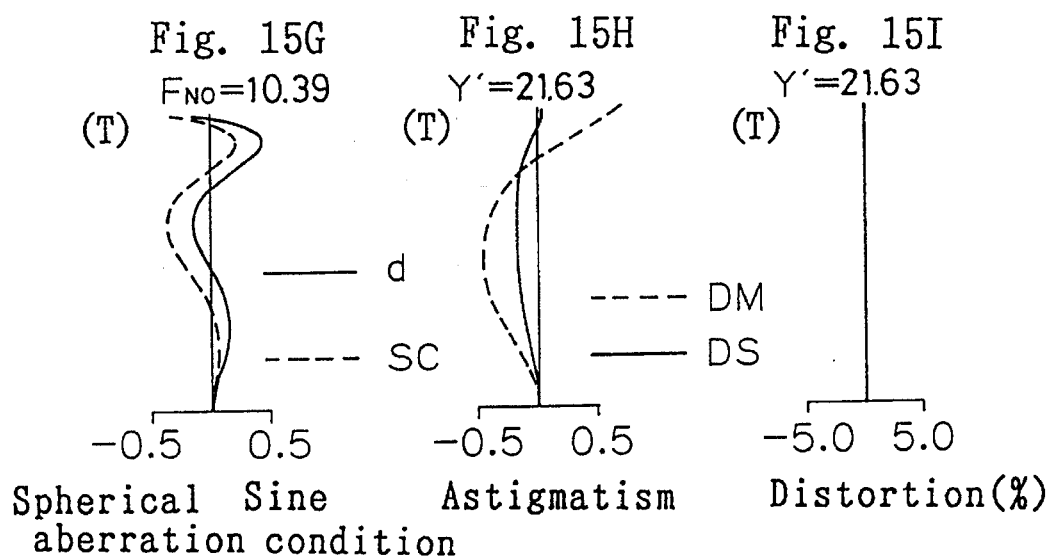

$F_{NO}=3.62$
(W)
— d
---- SC
-0.5  0.5
Spherical Sine
aberration condition $Y'=21.63$
(W)
---- DM
— DS
-0.5  0.5
Astigmatism $Y'=21.63$
(W)
-5.0  5.0
Distortion(%)

$F_{NO}=4.60$
(M)
— d
---- SC
-0.5  0.5
Spherical Sine
aberration condition $Y'=21.63$
(M)
---- DM
— DS
-0.5  0.5
Astigmatism $Y'=21.63$
(M)
-5.0  5.0
Distortion(%)

$F_{NO}=7.35$
(T)
— d
---- SC
-0.5  0.5
Spherical Sine
aberration condition $Y'=21.63$
(T)
---- DM
— DS
-0.5  0.5
Astigmatism $Y'=21.63$
(T)
-5.0  5.0
Distortion(%)

HIGH-MAGNIFICATION ZOOM LENS SYSTEM

BACKGROUND OF THE INVENTION

1. Field of the Invention

The present invention relates to a high-magnification zoom lens system, and more specifically, to a high-magnification zoom lens system for use in a lens shutter camera.

2. Description of the Prior Art

Optical systems for use in lens shutter cameras are required to be compact and of high magnification. In recent years, high magnification is particularly required for such optical systems.

In order to realize a compacter lens system, in Japanese Laid-open Patent Application No. H3-127012, an arrangement is proposed having four lens elements grouped into two units with a zoom ratio of approximately 2 to 2.5×. In order to realize a higher magnification, three-unit zoom lens systems of positive, positive, negative configuration have been used since they are advantageous in performance correction and the amount of lens movement is small.

However, if a zoom ratio of 2.5 to 3× or higher is achieved in the two-unit, four-lens-element arrangement of Japanese Laid-open Patent Application No. H3-127012, it is difficult to secure a required performance, and the amount of lens movement is large. Consequently, it is impossible to realize a compact, high-magnification optical system.

In the above-mentioned three-unit zoom lens systems of positive, positive, negative configuration, because of the arrangement thereof, plus distortion is apt to be generated at a shorter focal length condition. Restraining this is one of the problems in designing such lens systems. Moreover, in positive first lens units of the three-unit lens systems of positive, positive, negative configuration, it is typical that the most object side lens element is convex to the object side. For this reason, more number of lens elements are required in order to correct the plus distortion generated at a shorter focal length condition.

SUMMARY OF THE INVENTION

An object of the present invention is to provide a compact, low-cost, high-magnification zoom lens system with a zoom ratio of 2.5× or higher.

BRIEF DESCRIPTION OF THE DRAWINGS

This and other objects and features of this invention will become clear from the following description, taken in conjunction with the preferred embodiments with reference to the accompanied drawings in which:

FIGS. 9A to 9I show aberration curves of the first embodiment of the present invention;

FIGS. 10A to 10I show aberration curves of the second embodiment of the present invention;

FIGS. 11A to 11I show aberration curves of the third embodiment of the present invention;

FIGS. 12A to 12I show aberration curves of the fourth embodiment of the present invention;

FIGS. 13A to 13I show aberration curves of the fifth embodiment of the present invention;

FIGS. 14A to 14I show aberration curves of the sixth embodiment of the present invention;

FIGS. 15A to 15I show aberration curves of the seventh embodiment of the present invention.

DESCRIPTION OF THE PREFERRED EMBODIMENTS

Figure 1:
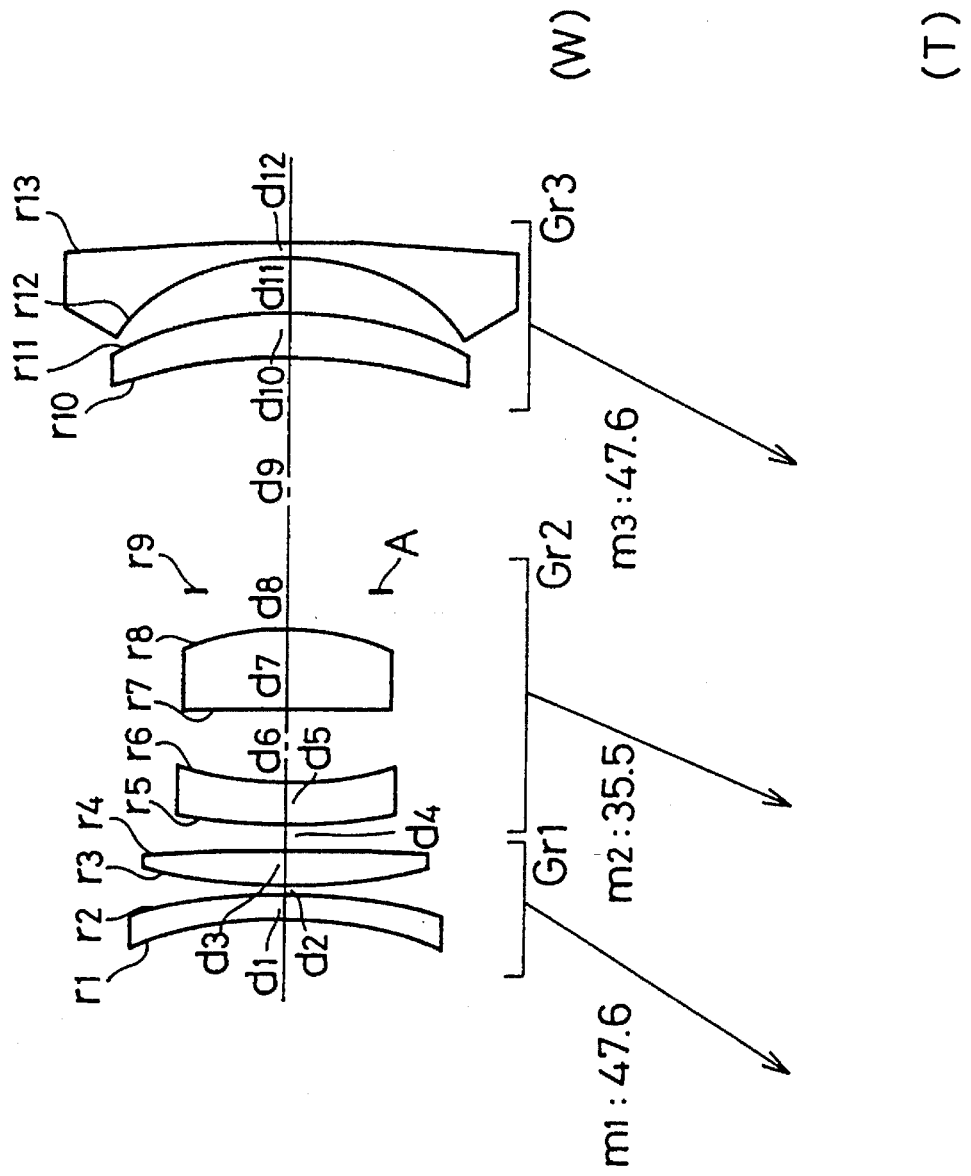
FIG. 1 is a cross-sectional view showing the lens arrangement of a first embodiment of the present invention.

In the present invention, in order to realize a compact, high-magnification zoom lens system, a three-unit arrangement of positive, positive, negative configuration is employed. Specifically, the following arrangement is employed since in order to realize a compact zoom lens system, it is required to minimize the number of lens elements in each lens unit, particularly, to minimize the number of lens elements of the positive first lens unit which has a relatively large outside lens diameter.

A first implementation of a high-magnification zoom lens system according to the present invention comprises from the object side a positive first lens unit, a positive second lens unit and a negative third lens unit. Zooming is performed by varying the distance between each lens unit. The positive first lens unit includes two lens elements. The positive second lens unit and the negative third lens unit include at least two lens elements, respectively. Moreover, the following condition (1) is fulfilled:

$$2.5 < \frac{f1}{fW} < 12 \qquad (1)$$

where f1 represents a focal length of the positive first lens unit, and fW represents a focal length of the entire lens system at the shortest focal length condition.

The condition (1) limits the power of the positive first lens unit. If the power of the positive first lens unit is strong, the power of the positive second lens unit must be weak relatively thereto. This is because if both the power of the positive first lens unit and the power of the positive second lens unit are strong, a sufficient performance correction and a sufficient back focal length are incompatible with each other. Specifically, if f1/fW exceeds the lower limit of the condition (1), the back focal length is short at the shortest focal length condition. Since it is necessary to increase the effective aperture of the positive first lens unit in order to secure a sufficient off-axial illumination at the shortest focal length condition, it is impossible to provide an optical system whose size along the diameter is small.

If the power of the positive first lens unit is weak, the movement amount of each lens unit should be large, and the aberration performance thereof is close to the aberration performance of two-unit lens systems of positive, negative configuration. Specifically, if f1/fW exceeds the upper limit of the condition (1), merits presented by the three-unit arrangement cannot be obtained. As a result, it is impossible to realize a high magnification.

Preferably, the lower limit of the above-described condition (1) is 3.0 as shown in the following condition (1'):

$$3.0 < \frac{f1}{fW} < 12 \qquad (1')$$

Further, by providing the following arrangements to the optical system fulfilling the condition (1), a compact, high-magnification zoom lens system can be realized: zooming from the shortest focal length condition to a longest focal length condition is performed by moving each lens unit so that the distance between the positive first lens unit and the positive second lens unit increases and that the distance between the positive second lens unit and the negative third lens unit decreases, and the following condition (2) is fulfilled:

$$2.0 < \frac{f1}{fW} < 12 \qquad (2)$$

where f2 represents a focal length of the positive second lens unit.

As described above, in optical systems of this type, in order to secure a sufficient illumination and a sufficient performance, it is important that the power of the positive first lens unit and the power of the positive second lens unit are appropriately balanced. Specifically, if f1/f2 exceeds the lower limit of the condition (2), the power of the positive first lens unit is relatively strong, so that it is difficult to secure a sufficient back focal length and a sufficient off-axial illumination at the shortest focal length condition. If f1/f2 exceeds the upper limit of the condition (2), the power of the positive first lens unit is relatively weak, so that the merit of the three-unit arrangement that the amount of lens movement is small is not obtained and the aberration performance thereof is close to the aberration performance of the two-unit arrangement. As a result, the object of the present invention cannot be achieved.

Further, by providing the following arrangement to the optical system fulfilling the condition (2), a compact, high-performance, high-magnification zoom lens system can be realized: from the object side, the positive first lens unit includes a negative lens element and a positive lens element, the positive second lens unit includes a negative lens element and a positive lens element and the negative third lens unit includes a positive lens element and a negative lens element, and at least one aspherical surface is provided in the positive second lens unit and the negative third lens unit.

With this arrangement where each lens unit includes two lens elements, the size and the cost can effectively be reduced. When the negative third lens unit is of positive, positive, negative lens element configuration, the problem of securing a sufficient back focal length at a shorter focal length condition is inevitably presented. In the present invention, this problem is solved by providing a retro-type arrangement (i.e. negative, positive lens element configuration) to the positive first and second lens units.

In order to secure an excellent performance with a minimum number of lens elements, at least one aspherical surface is provided in each of the positive second lens unit and the negative third lens unit. The aspherical surface of the positive second lens unit is used to correct spherical aberration, while the aspherical surface of the negative third lens unit is used to correct off-axial coma and distortion. That is, in order to secure a more excellent performance, it is preferable to arrange an aspherical surface in each of the positive second lens unit and the negative third lens unit.

Regarding the arrangement of the aspherical surfaces, by employing bi-aspherical lens elements as the negative lens element of the positive second lens unit and as the positive lens element of the negative third lens unit, a zoom lens system having a higher performance can be realized. While two or more lens elements are required to control principal aberrations such as spherical aberration, coma and distortion, by employing a bi-aspherical lens, the control can be performed with only one lens element, and furthermore, delicate control is possible. This largely contributes to the reduction of the size.

Moreover, if the movement loci of the positive first lens unit and the negative third lens unit are the same, the movements of both lens units can be generated by the same cam. This leads to a simple arrangement, thereby reducing the cost.

A second implementation of the high-magnification zoom lens system according to the present invention comprises from the object side a positive first lens unit, a positive second lens unit and a negative third lens unit. Zooming is performed by varying the distance between each lens unit. The most object side lens element of the positive first lens unit is a negative lens element whose object side surface has a stronger negative refractive power than an image side surface. With this arrangement, a compact, low-cost, high-magnification zoom lens system can be realized.

By employing a negative lens element strongly concave to the object side as the most object side negative lens element of the positive first lens unit, the plus distortion generated at a shorter focal length condition can be corrected. As a result, a high-magnification zoom lens system having an excellent performance is realized.

Further, by employing a negative meniscus lens element as the most object side negative lens element of the positive first lens unit in the second implementation of the high-magnification zoom lens system according to the present invention, a high-magnification zoom lens system having a more excellent performance can be realized.

If a bi-concave lens element is employed as the most object side lens element of the positive first lens unit, negative power increases in the positive first lens unit, so that it is impossible to correct spherical aberration within the positive first lens unit. This problem is solved by increasing the number of lens elements in the positive first lens unit; however, this contradicts the reduction in size and cost. In this implementation, by employing a negative meniscus lens element as the most object side lens element of the positive first lens unit, simultaneous correction of distortion and spherical aberration is enabled.

Further, by providing the following arrangements to the above-described arrangement where the most object side lens element of the positive first lens unit is a negative meniscus lens element, a high-magnification zoom lens system having a more excellent performance can be realized: the most object side lens element of the positive first lens element is concave to the object side, and the following condition (3) is fulfilled:

$$0.03 < \frac{|r1|}{f1} < 0.50 \qquad (3)$$

where r1 represents a radius of curvature of the most object side surface of the positive first lens unit.

If |r1|/f1 exceeds the lower limit of the condition (3), the luminous fluxes incident on the first surface are caused to spring up largely, so that it is difficult to secure a sufficient performance. If |r1|/f1 exceeds the upper limit of the condition (3), the effect of correcting distortion is diminished.

The condition (3) limits the configuration of the most object side surface of the positive first lens unit. In order to secure a more excellent performance, the curvature, i.e. the meniscus degree of the film side surface of a first lens element (the most object side lens element of the positive first lens unit) is an important factor.

For example, an arrangement fulfilling the following condition (4) is preferable in securing a higher optical performance:

$$2 < \left| \frac{r1 + r2}{r1 - r2} \right| < 10 \quad (4)$$

where r2 represents a radius of curvature of the film side surface of the most object side lens element of the positive first lens unit.

If the lower limit of the condition (4) is exceeded, it is necessary to increase the number of lens elements in order to eliminate aberrations within the positive first lens unit. When the upper limit of the condition (4) is exceeded, the effect of correcting distortion by the first surface is decreased, so that it is difficult to realize an excellent performance.

Preferably, the lower limit of the above-described condition (4) is 2.5 as shown in the following condition (4'):

$$2.5 < \left| \frac{r1 + r2}{r1 - r2} \right| < 10 \quad (4')$$

Moreover, the following conditions (5) and (6) are preferably fulfilled:

$$2.7 \times 10^2 < \frac{f1 \cdot fT}{fW} < 2.7 \times 10^3 \quad (5)$$

$$0.01 < \frac{D1}{f1} < 0.06 \quad (6)$$

where fT represents a focal length of the entire lens system at the longest focal length condition, and D1 represents the total length of the positive first lens unit.

The condition (5) limits the power of the positive first lens unit. If the power of the positive first lens unit is strong, the power of the positive second lens unit must be weak relatively thereto. This is because if both the power of the positive first lens unit and the power of the positive second lens unit are strong, a sufficient performance correction and a sufficient back focal length are incompatible with each other. Specifically, if f1.fT/fW exceeds the lower limit of the condition (5), the back focal length at the shortest focal length condition is short. Since it is necessary to increase the effective aperture of the positive first lens unit in order to secure a sufficient off-axial illumination at the shortest focal length condition, it is impossible to realize a zoom lens system whose size along the diameter is small.

If the power of the positive first lens unit is weak, the movement amount of each lens unit should be large, and the aberration performance thereof is close to the aberration performance of the two-unit lens systems of positive, negative configuration. Specifically, if f1.fT/fW exceeds the upper limit of the condition (5), merits presented by the three-unit arrangement cannot be obtained. As a result, it is impossible to realize a high magnification.

If the upper value of the condition (6) is exceeded, the size of the positive first lens unit should be large, so that it is difficult to reduce the size. Moreover, since the focal length of the positive first lens unit is short, aberration correction is difficult. If the lower limit of the condition (6) is exceeded, the focal length of the positive first lens unit is long, so that the lens movement amount for zooming is large. Moreover, it is impossible to secure sufficient holding portions at the peripheries of the lens elements constituting the positive first lens unit.

Numerical data of first to eighth embodiments of the present invention are shown in Tables 1 to 8, respectively. In each table, ri (i=1,2,3,...) represents a radius of curvature of an ith lens surface counted from the object side, di (i=1,2,3,...) represents an ith axial distance counted from the object side, Ni (i=1,2,3,...) and vi (i=1,2,3,...) represent a refractive index and an Abbe number, to the d-line, of an ith lens element counted from the object side, respectively. f represents a focal length of the entire lens system. FNO represents a minimum f-number.

In each table, surfaces marked with asterisks are aspherical surfaces, which are defined by the following equation (7):

$$X = \frac{C \cdot Y^2}{1 + (1 - \epsilon \cdot Y^2 \cdot C^2)^{1/2}} + \sum_i A i Y^i \quad (7)$$

where X represents a displacement amount from a reference surface along the optical axis, Y represents a height in a direction perpendicular to the optical axis, C represents a paraxial curvature, ε represents a conic constant, and Ai represents an lth-order aspherical coefficient.

Figure 2:
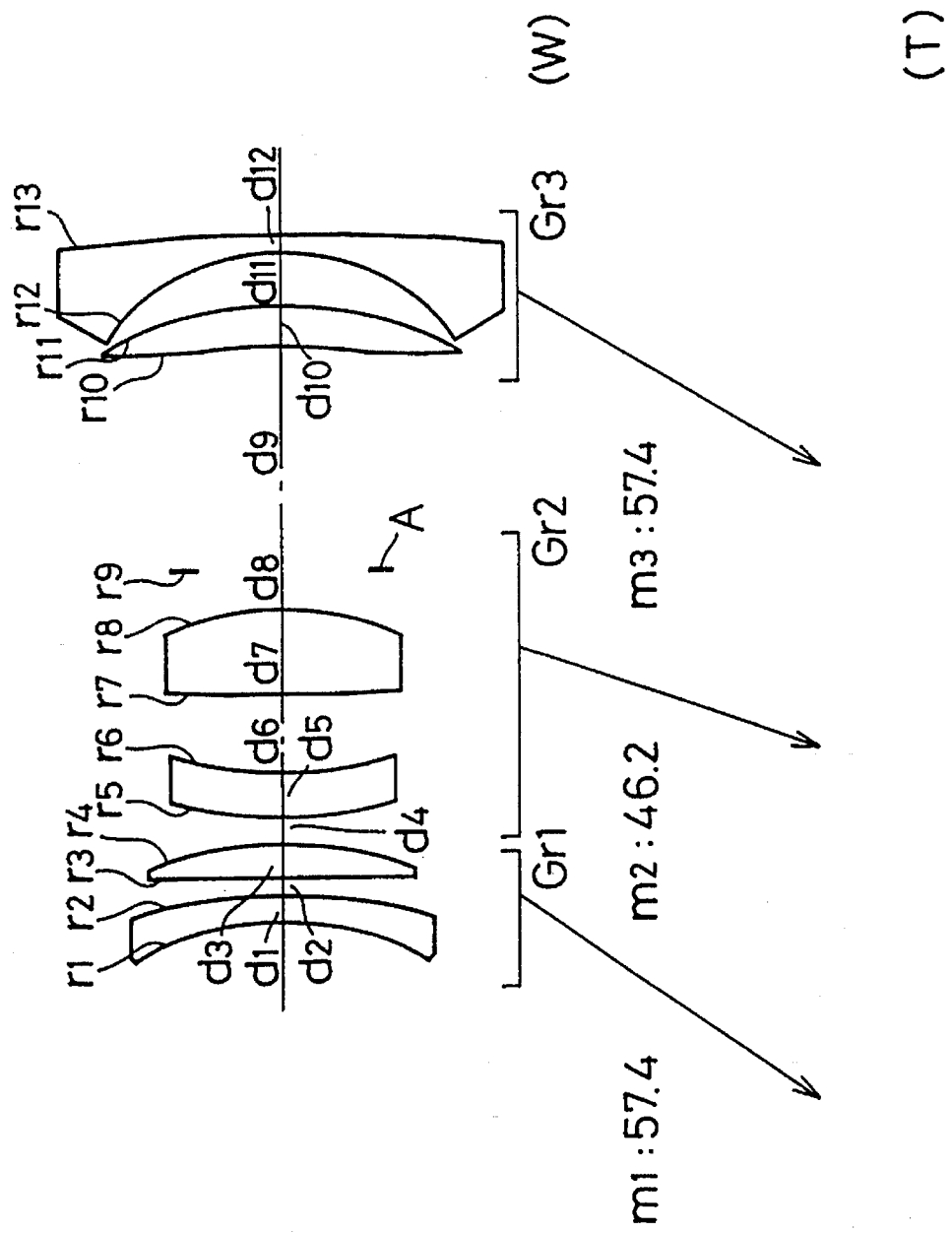
FIG. 2 is a cross-sectional view showing the lens arrangement of a second embodiment of the present invention.
Figure 3:
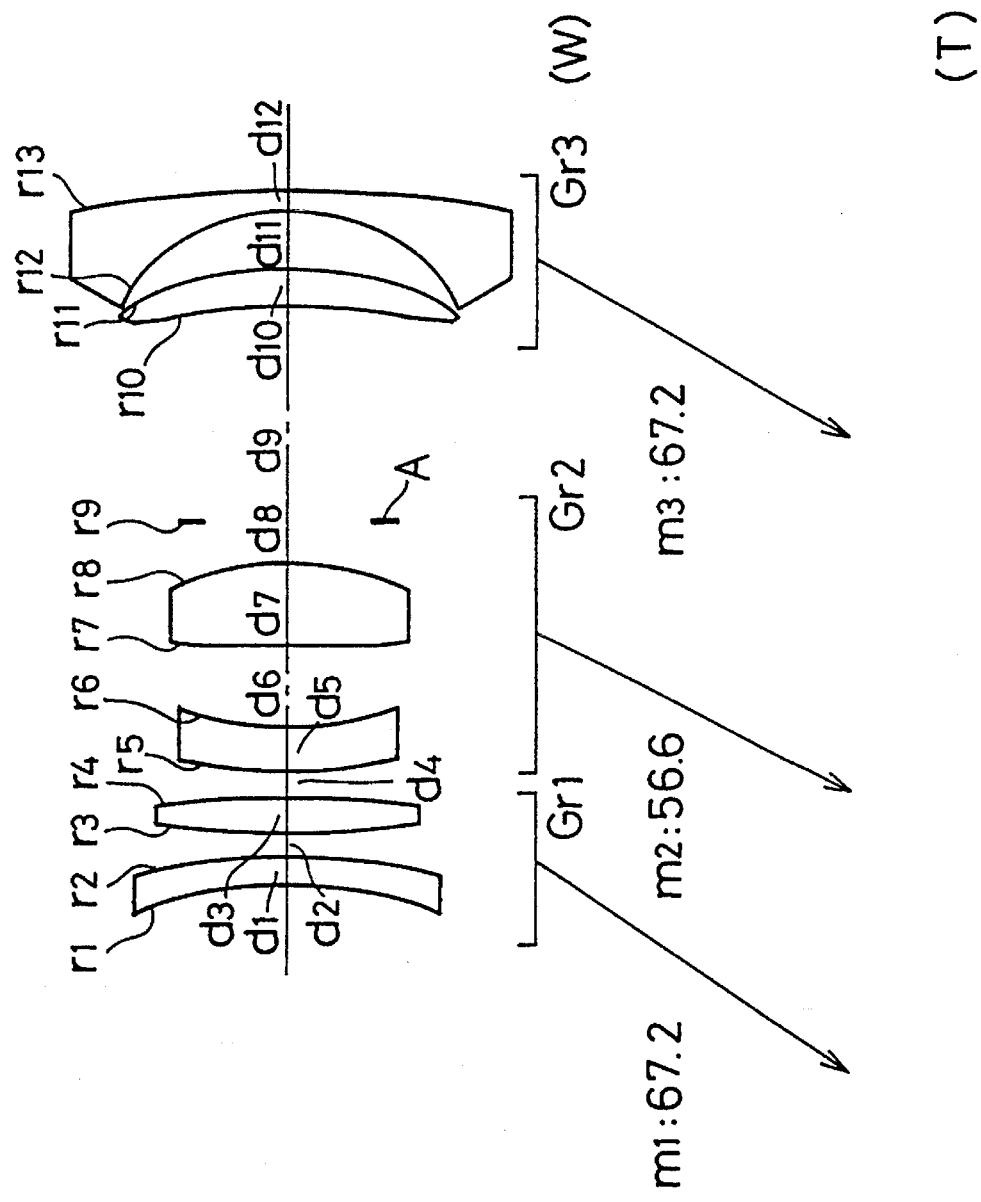
FIG. 3 is a cross-sectional view showing the lens arrangement of a third embodiment of the present invention.
Figure 4:
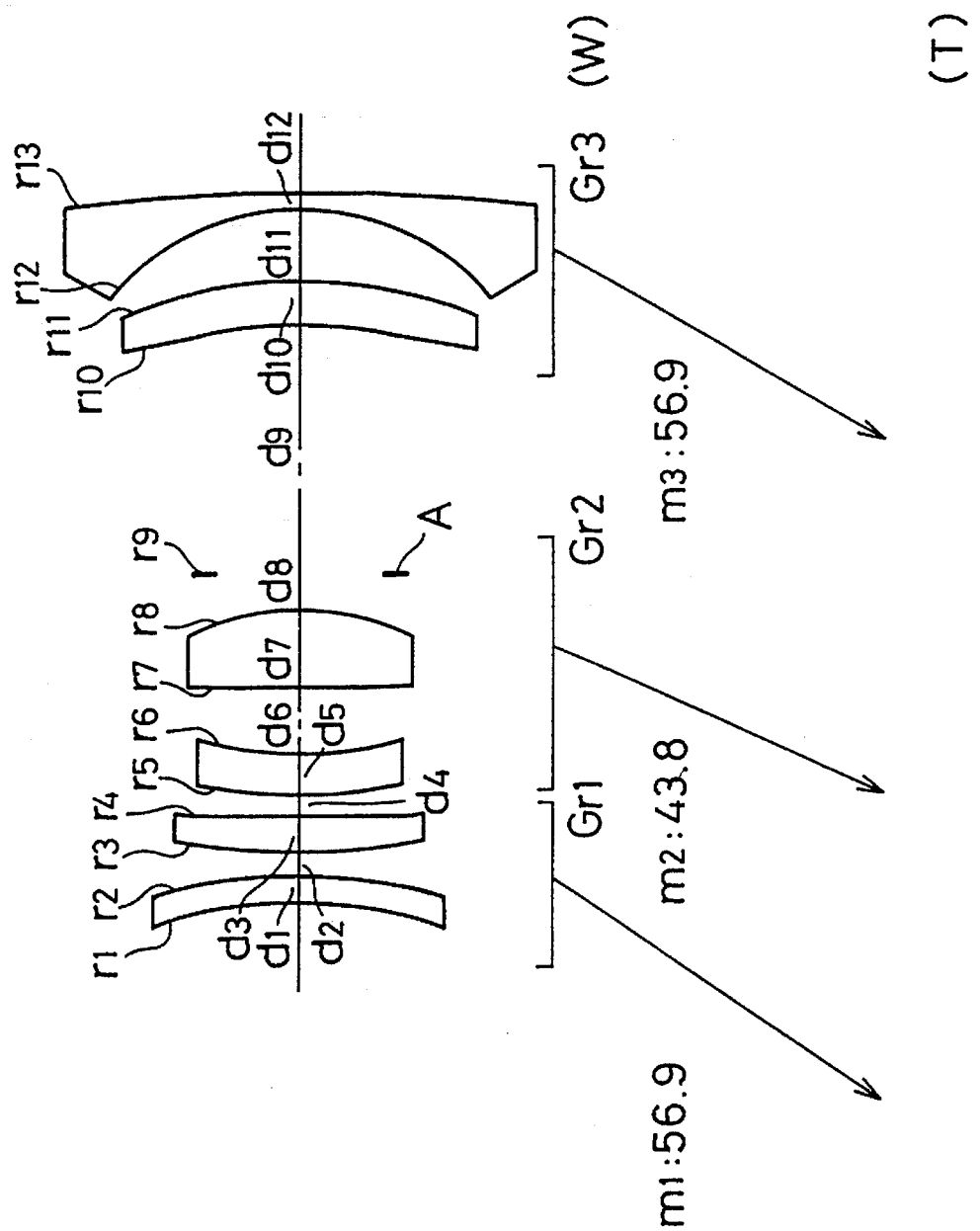
FIG. 4 is a cross-sectional view showing the lens arrangement of a fourth embodiment of the present invention.
Figure 5:
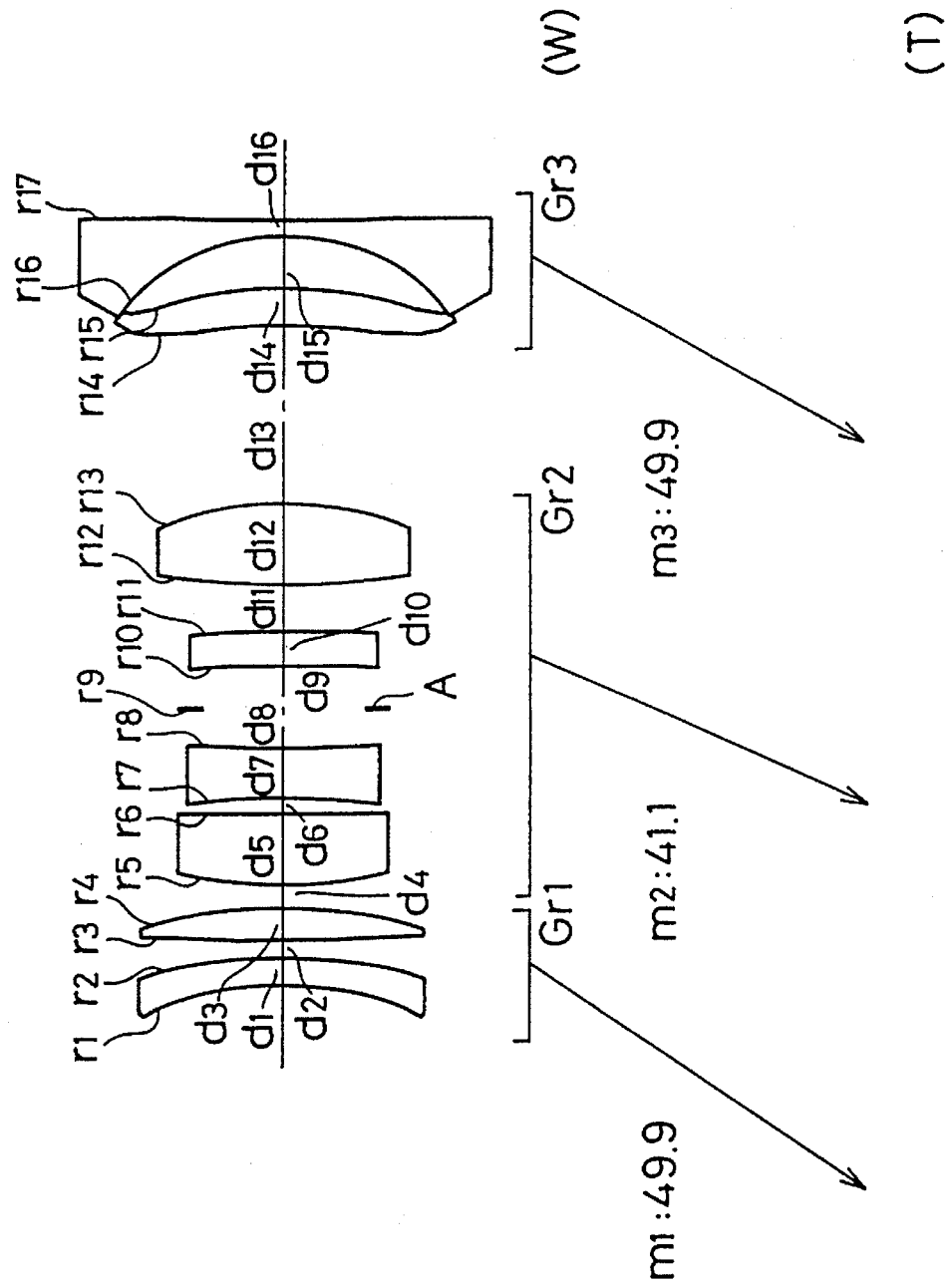
FIG. 5 is a cross-sectional view showing the lens arrangement of a fifth embodiment of the present invention.
Figure 6:
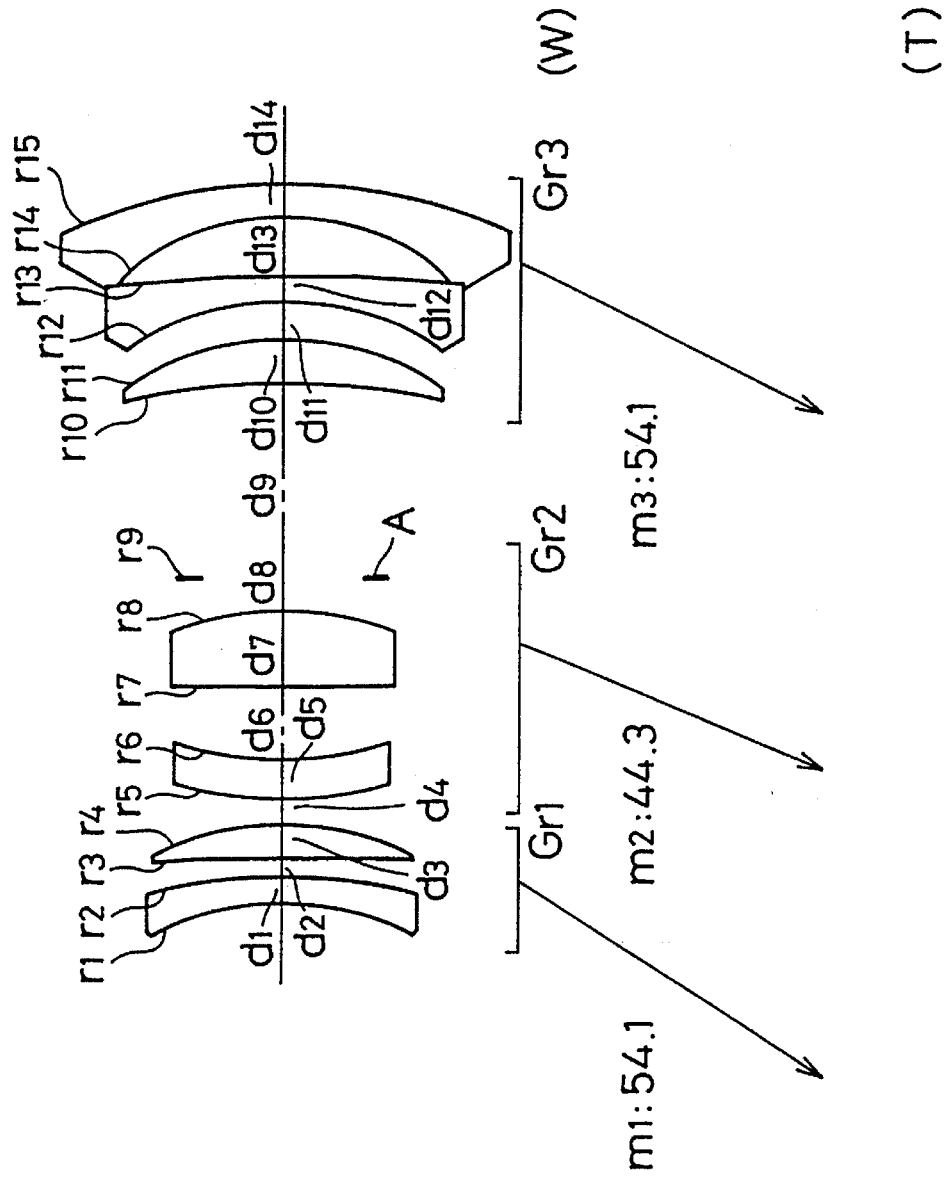
FIG. 6 is a cross-sectional view showing the lens arrangement of a sixth embodiment of the present invention.
Figure 7:
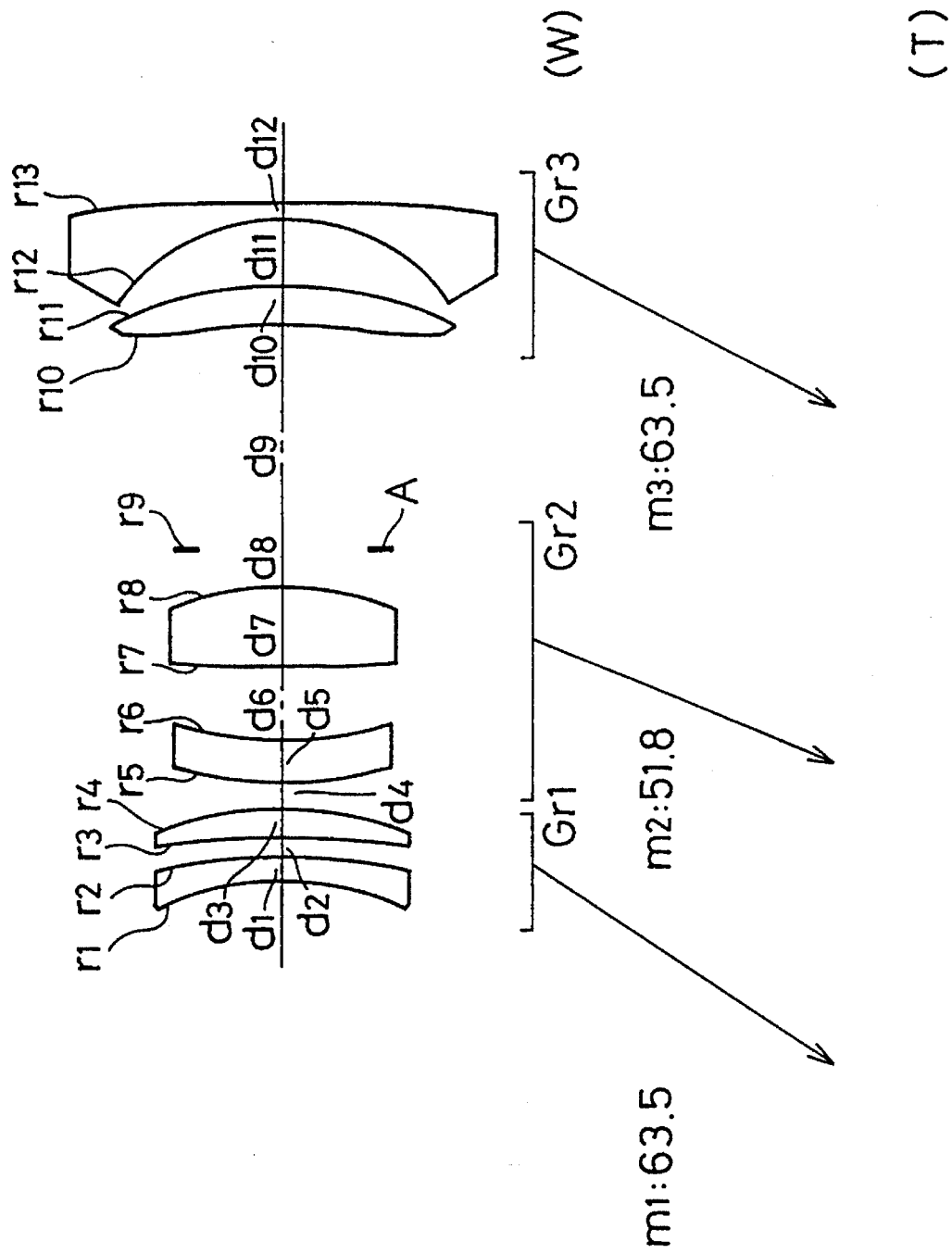
FIG. 7 is a cross-sectional view showing the lens arrangement of a seventh embodiment of the present invention.
Figure 8:
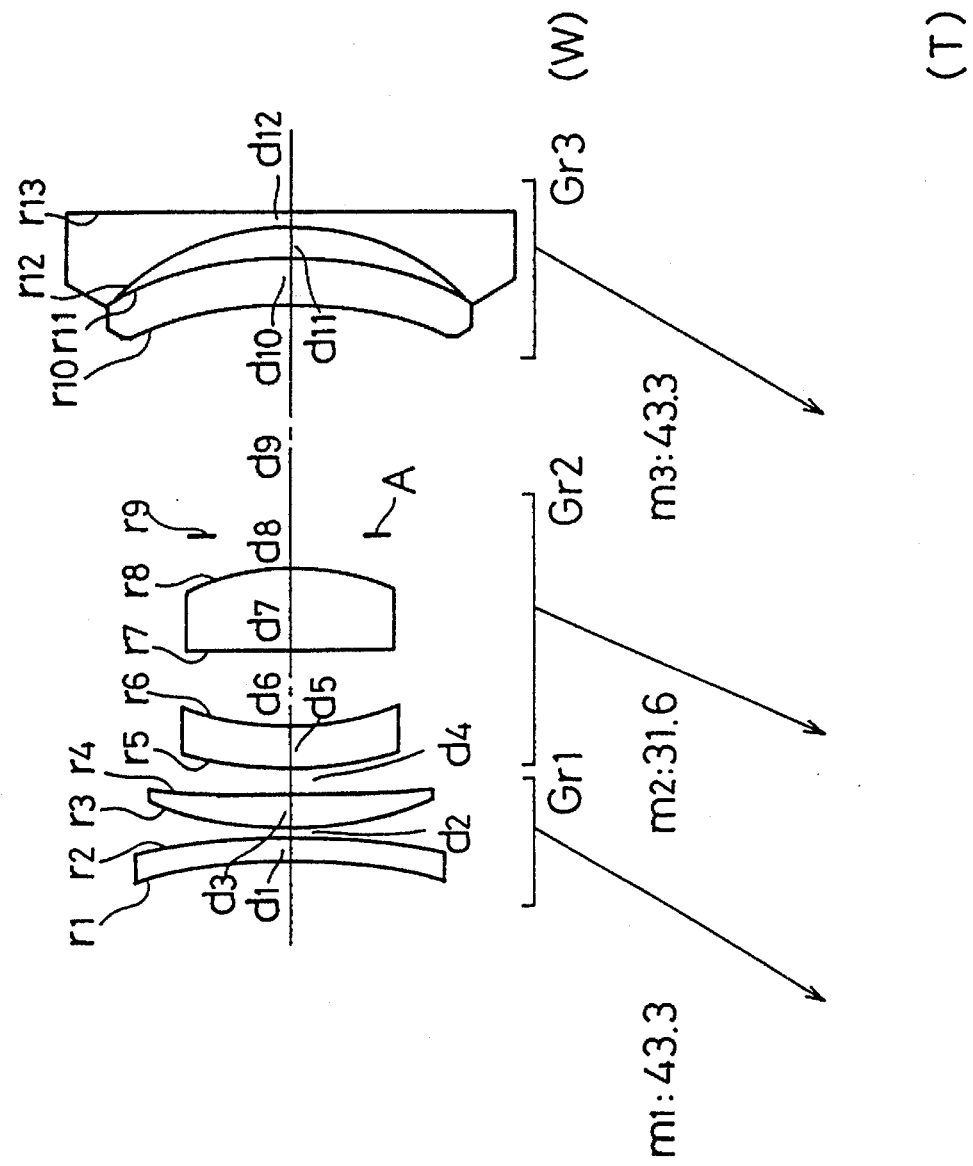
FIG. 8 is a cross-sectional view showing the lens arrangement of an eighth embodiment of the present invention.

FIGS. 1 to 8 are cross-sectional views showing the lens arrangements of the first to eighth embodiments, respectively, at the shortest focal length condition (W). Arrows m1, m2 and m3 schematically show the movement loci of the first, second and third lens units Gr1, Gr2 and Gr3, respectively, from the shortest focal length condition (W) to the longest focal length condition (T). The numerical values next to m1, m2 and m3 are movement amounts of the lens units Gr1, Gr2 and Gr3.

The first embodiment comprises from the object side a positive first lens unit Gr1 including a negative meniscus lens element concave to the object side and a positive bi-convex lens element, a positive second lens unit Gr2 including a negative meniscus lens element concave to the image side, a positive meniscus lens element convex to the image side and an aperture stop A, and a negative third lens unit Gr3 including a positive meniscus lens element convex to the image side and a negative meniscus lens element concave to the object side.

In the first embodiment, the following surfaces are aspherical: the object side surface of the negative meniscus lens element and the object side surface of the positive lens element of the positive first lens unit Gr1; both side surfaces of the negative meniscus lens element of the positive second lens unit Gr2; and both side surfaces of the positive meniscus lens element of the negative third lens unit Gr3.

The second embodiment comprises from the object side a positive first lens unit Gr1 including a negative meniscus lens element concave to the object side and a positive bi-convex lens element, a positive second lens unit Gr2 including a negative meniscus lens element concave to the image side, a positive bi-convex lens element and an aperture stop A, and a negative third lens unit Gr3 including a positive meniscus lens element convex to the image side and a negative meniscus lens element concave to the object side.

In the second embodiment, the following surfaces are aspherical: both side surfaces of the negative meniscus lens element of the positive second lens unit Gr2; and both side surfaces of the positive meniscus lens element of the negative third lens unit Gr3.

The third embodiment comprises from the object side a positive first lens unit Gr1 including a negative meniscus lens element concave to the object side and a positive bi-convex lens element, a positive second lens unit Gr2 including a negative meniscus lens element concave to the image side, a positive bi-convex lens element and an aperture stop A, and a negative third lens unit Gr3 including a positive meniscus lens element convex to the image side and a negative meniscus lens element concave to the image side.

In the third embodiment, the following surfaces are aspherical: the object side surface of the positive lens element of the positive first lens unit Gr1; both side surfaces of the negative meniscus lens element of the positive second lens unit Gr2; and both side surfaces of the positive meniscus lens element of the negative third lens unit Gr3.

The fourth embodiment comprises from the object side a positive first lens unit Gr1 including a negative meniscus lens element concave to the object side and a positive meniscus lens element convex to the object side, a positive second lens unit Gr2 including a negative meniscus lens element concave to the image side, a positive bi-convex lens element and an aperture stop A, and a third lens unit Gr3 including a positive meniscus lens element convex to the image side and a negative meniscus lens element concave to the object side.

In the fourth embodiment, the following surfaces are aspherical: the object side surface of the positive meniscus lens element of the positive first lens unit Gr1; both side surfaces of the negative meniscus lens element of the positive second lens unit Gr2; and both side surfaces of the positive meniscus lens element of the negative third lens unit Gr3.

The fifth embodiment comprises from the object side a positive first lens unit Gr1 including a negative meniscus lens element concave to the object side and a positive bi-convex lens element, a positive second lens unit Gr2 including a positive meniscus lens element convex to the object side, a negative bi-concave lens element and an aperture stop A, and a negative third lens unit Gr3 including a positive meniscus lens element convex to the image side and a negative bi-concave lens element.

In the fifth embodiment, the following surfaces are aspherical: the object side surface of the positive lens element of the positive first lens unit Gr1; the object side surface of the positive meniscus lens element convex to the image side of the positive second lens unit Gr2; and both side surfaces of the positive meniscus lens element of the third lens unit Gr3.

The sixth embodiment comprises from the object side a positive first lens unit Gr1 including a negative meniscus lens element concave to the object side and a positive meniscus lens element convex to the image side, a positive second lens unit Gr2 including a negative meniscus lens element concave to the image side, a positive bi-convex lens element and an aperture stop A, and a negative third lens unit Gr3 including a positive meniscus lens element convex to the image side and two negative meniscus lens elements concave to the object side.

In the sixth embodiment, the following surfaces are aspherical: the object side surface of the positive meniscus lens element of the positive first lens unit Gr1; both side surfaces of the negative meniscus lens element of the positive second lens unit Gr2; and both side surfaces of the positive meniscus lens element of the negative third lens unit Gr3.

The seventh embodiment comprises from the object side a positive first lens unit Gr1 including a negative meniscus lens element concave to the object side and a positive meniscus lens element convex to the image side, a positive second lens unit Gr2 including a negative meniscus lens element concave to the image side, a positive bi-convex lens element and an aperture stop A, and a negative third lens unit Gr3 including a positive meniscus lens element convex to the image side and a negative meniscus lens element concave to the object side.

In the seventh embodiment, the following surfaces are aspherical: both side surfaces of the negative meniscus lens element of the positive second lens unit Gr2; and both side surfaces of the positive meniscus lens element of the negative third lens unit Gr3.

The eighth embodiment comprises from the object side a positive first lens unit Gr1 including a negative meniscus lens element concave to the object side and a positive meniscus lens element convex to the object side, a positive second lens unit Gr2 including a negative meniscus lens element concave to the image side, a positive meniscus lens element convex to the image side and an aperture stop A, and a negative third lens unit Gr3 including two negative meniscus lens elements concave to the object side.

In the eight embodiment, the following surfaces are aspherical: the object side surface of the negative meniscus lens element and the object side surface of the positive meniscus lens element of the positive first lens unit Gr1; both side surfaces of the negative meniscus lens element of the positive second lens unit Gr2; and both side surfaces of the object side negative meniscus lens element of the negative third lens unit Gr3.

Figure 16A:
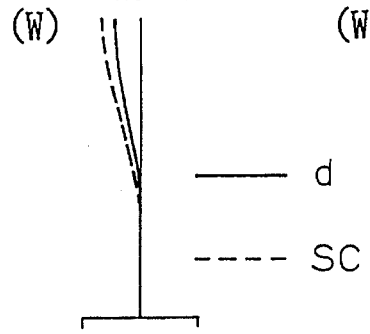
FIGS. 16A to 16I show aberration curves of the eighth embodiment of the present invention.
Figure 16B:
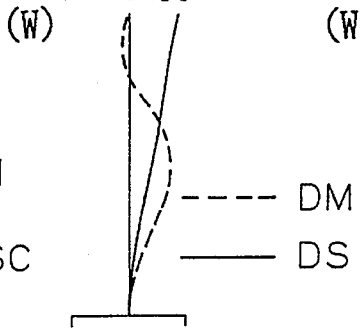
Figure 16C:
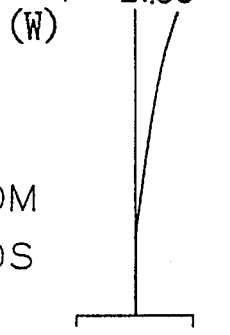
Figure 16D:
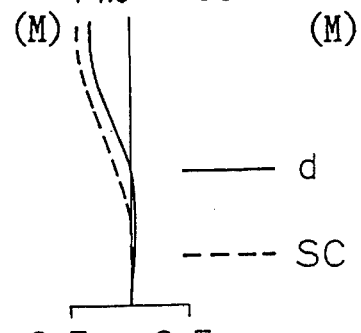
Figure 16E:
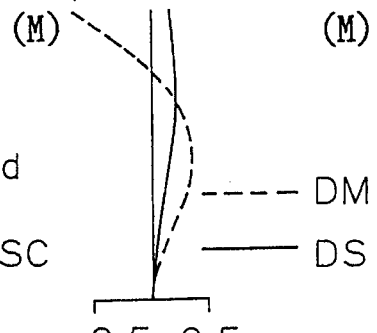
Figure 16F:
Figure 16G:
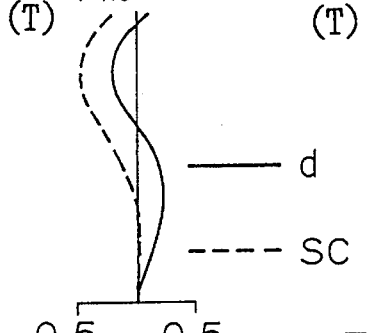
Figure 16H:
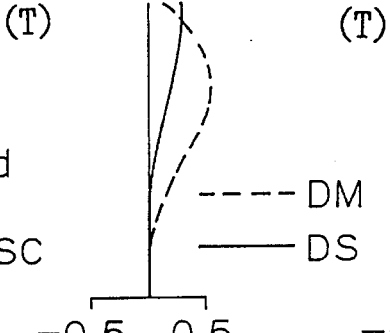
Figure 16I:

FIGS. 9A to 9I through 16A to 16I show aberration curves of the first to eighth embodiments. In each figure, (W) shows aberration at the shortest focal length condition, (M) shows aberration at the middle focal length condition, and (T) shows aberration at the longest focal length condition. Solid line d represents aberrations to d-line. Broken line SC represents sine condition. Broken line DM and solid line DS represent astigmatism on the meridional and sagittal surfaces, respectively.

Table 9 shows values of f1/fW and f1/f2 of the conditions (1) and (2) for the first to eighth embodiments. Table 10 shows values of |r1|/f1 and (r1+r2)/(r1−r2) of the conditions (3) and (4) for the first to eighth embodiments. Table 11 shows values of f1.fT/fW and D1/f1 of the conditions (5) and (6) for the first to eighth embodiment.

In the above-described embodiments, it is preferable that the following conditions (8) to (10) are further fulfilled:

$$0.8 < \frac{f1}{fT} < 1.3 \quad (8)$$

$$\tan\omega > 0.72 \quad (9)$$

$$2.2 < \frac{f1}{y'} < 7.7 \quad (10)$$

where ω represents a half angle of view of the entire lens system at the shortest focal length condition, and y' represents a maximum image height.

The conditions (8) and (10) define an appropriate power of the first lens unit similarly to the conditions, (1) and (5). The condition (9) defines an appropriate shortest focal length condition (shortest focal length).

As is clear from the above-mentioned embodiments, according to the present invention, a compact, low-cost, high-magnification zoom lens system with a zoom ratio of 2.5× or higher is realized. Particularly, by providing a zoom ratio of 2.5 to 3× or higher and minimizing the number of lens elements and the lens diameter, a compact, low-cost zoom lens system having a high performance is realized. Specifically, by minimizing the number of lens elements of the positive first lens unit and providing a novel characteristic to the most object side lens element of the positive first lens unit, an excellent aberration performance is realized with a simple arrangement where the number of lens elements are minimized. The total length and the diameter of the front lens element are much smaller than those of conventional lens systems. Thus, the present invention satisfactorily achieve the object thereof.

Obviously, many modifications and variations of the present invention are possible in light of the above teachings. It is therefore to be understood that within the scope of the appended claims, the invention may be practiced other than as specifically described.

TABLE 1

(1st Embodiment)

f = 39.3 to 55.0 to 102.1    FNO = 3.62 to 4.75 to 8.04

| | Radius of Curvature | Axial Distance | | Refractive Index | | Abbe Number |
|---|---|---|---|---|---|---|
| r1* | −24.637 | | | | | |
| | | d1 | 1.500 | N1 1.80741 | v1 | 31.59 |
| r2 | −32.135 | | | | | |
| | | d2 | 0.500 | | | |
| r3* | 38.081 | | | | | |
| | | d3 | 2.000 | N2 1.51680 | v2 | 64.20 |
| r4 | −177.382 | | | | | |
| | | d4 | 1.500 to 6.815 to 13.574 | | | |
| r5* | 22.727 | | | | | |
| | | d5 | 2.500 | N3 1.84506 | v3 | 23.66 |
| r6* | 17.030 | | | | | |
| | | d6 | 4.276 | | | |
| r7 | −727.876 | | | | | |
| | | d7 | 4.900 | N4 1.52307 | v4 | 58.57 |
| r8 | −14.259 | | | | | |
| | | d8 | 2.200 | | | |
| r9 | ∞ (Aperture stop) | | | | | |
| | | d9 | 14.148 to 8.833 to 2.074 | | | |
| r10* | −25.302 | | | | | |
| | | d10 | 2.758 | N5 1.58340 | v5 | 30.23 |
| r11 | −20.895 | | | | | |
| | | d11 | 3.298 | | | |
| r12 | −13.697 | | | | | |
| | | d12 | 1.000 | N6 1.67790 | v6 | 55.38 |
| r13 | −124.022 | | | | | |

Aspherical Coefficients r1 : $\epsilon = 0.10000 \times 10$
$A4 = 0.22545 \times 10^{-5}$
$A6 = 0.41368 \times 10^{-7}$
$A8 = -0.95522 \times 10^{-10}$
$A10 = -0.24177 \times 10^{-12}$
$A12 = -0.17429 \times 10^{-14}$ r3 : $\epsilon = 0.10000 \times 10$
$A4 = 0.35042 \times 10^{-5}$
$A6 = 0.26666 \times 10^{-7}$
$A8 = -0.59025 \times 10^{-9}$
$A10 = -0.25201 \times 10^{-11}$
$A12 = 0.54898 \times 10^{-13}$ r5 : $\epsilon = 0.10000 \times 10$
$A4 = -0.12417 \times 10^{-3}$
$A6 = -0.97074 \times 10^{-6}$
$A8 = 0.12044 \times 10^{-8}$
$A10 = 0.66132 \times 10^{-10}$
$A12 = -0.15556 \times 10^{-11}$ r6 : $\epsilon = 0.10000 \times 10$
$A4 = -0.10076 \times 10^{-3}$
$A6 = -0.14758 \times 10^{-5}$
$A8 = 0.24553 \times 10^{-7}$
$A10 = -0.21049 \times 10^{-9}$
$A12 = -0.16260 \times 10^{-11}$
$A14 = 0.65829 \times 10^{-15}$
$A16 = 0.58947 \times 10^{-16}$ r10 : $\epsilon = 0.10000 \times 10$
$A3 = -0.42559 \times 10^{-3}$
$A4 = 0.24350 \times 10^{-3}$
$A5 = -0.41374 \times 10^{-4}$
$A6 = 0.44517 \times 10^{-5}$
$A7 = 0.73797 \times 10^{-7}$
$A8 = -0.45062 \times 10^{-7}$
$A9 = -0.42551 \times 10^{-9}$

TABLE 1-continued $A10 = 0.33908 \times 10^{-9}$
$A11 = 0.79128 \times 10^{-11}$
$A12 = -0.20278 \times 10^{-11}$
$A13 = 0.60303 \times 10^{-15}$
$A14 = 0.64064 \times 10^{-15}$
$A15 = 0.10109 \times 10^{-15}$
$A16 = 0.11619 \times 10^{-16}$ r11 : $\epsilon = 0.10000 \times 10$
$A3 = -0.40645 \times 10^{-3}$
$A4 = 0.14149 \times 10^{-3}$
$A5 = -0.12074 \times 10^{-4}$
$A6 = -0.24598 \times 10^{-6}$
$A7 = 0.39639 \times 10^{-7}$
$A8 = 0.41323 \times 10^{-7}$
$A9 = -0.66676 \times 10^{-8}$
$A10 = 0.10617 \times 10^{-9}$
$A11 = 0.30611 \times 10^{-10}$
$A12 = -0.13930 \times 10^{-11}$
$A13 = -0.15678 \times 10^{-14}$

TABLE 2

(2nd Embodiment)

f = 39.3 to 55.0 to 116.4    FNO = 3.62 to 4.89 to 9.78

| | Radius of Curvature | Axial Distance | | Refraction Index | | Abbe Number |
|---|---|---|---|---|---|---|
| r1 | −17.326 | | | | | |
| | | d1 | 1.500 | N1 1.83400 | v1 | 37.05 |
| r2 | −30.899 | | | | | |
| | | d2 | 1.000 | | | |
| r3 | 1052.587 | | | | | |
| | | d3 | 2.000 | N2 1.51680 | v2 | 64.20 |
| r4 | −20.348 | | | | | |
| | | d4 | 1.500 to 6.178 to 12.686 | | | |
| r5* | 19.265 | | | | | |
| | | d5 | 2.500 | N3 1.84666 | v3 | 23.82 |
| r6* | 16.277 | | | | | |
| | | d6 | 4.705 | | | |
| r7 | 209.666 | | | | | |
| | | d7 | 4.900 | N4 1.51680 | v4 | 64.20 |
| r8 | −16.618 | | | | | |
| | | d8 | 2.200 | | | |
| r9 | ∞ (Aperture stop) | | | | | |
| | | d9 | 13.260 to 8.583 to 2.074 | | | |
| r10* | −40.629 | | | | | |
| | | d10 | 2.500 | N5 1.58340 | v5 | 30.23 |
| r11* | −21.069 | | | | | |
| | | d11 | 3.125 | | | |
| r12 | −12.170 | | | | | |
| | | d12 | 1.000 | N6 1.80100 | v6 | 46.54 |
| r13 | −112.448 | | | | | |

Aspherical Coefficients r5 : $\epsilon = 0.10000 \times 10$
$A4 = -0.97544 \times 10^{-4}$
$A6 = -0.10716 \times 10^{-5}$
$A8 = 0.10311 \times 10^{-8}$
$A10 = 0.66101 \times 10^{-10}$
$A12 = -0.15569 \times 10^{-11}$ r6 : $\epsilon = 0.10000 \times 10$
$A4 = -0.89731 \times 10^{-4}$
$A6 = -0.17068 \times 10^{-5}$
$A8 = 0.23481 \times 10^{-7}$
$A10 = -0.21301 \times 10^{-9}$
$A12 = -0.16296 \times 10^{-11}$
$A14 = 0.65829 \times 10^{-15}$
$A16 = 0.58947 \times 10^{-16}$ r10 : $\epsilon = 0.10000 \times 10$
$A3 = -0.48875 \times 10^{-3}$
$A4 = 0.24712 \times 10^{-3}$
$A5 = -0.41550 \times 10^{-4}$
$A6 = 0.45239 \times 10^{-5}$
$A7 = 0.79939 \times 10^{-7}$
$A8 = -0.44781 \times 10^{-7}$ TABLE 2-continued $A9 = -0.42511 \times 10^{-9}$
$A10 = 0.33770 \times 10^{-9}$
$A11 = 0.79128 \times 10^{-11}$
$A12 = -0.20467 \times 10^{-11}$
$A13 = 0.60303 \times 10^{-15}$
$A14 = 0.64064 \times 10^{-15}$
$A15 = 0.10109 \times 10^{-15}$
$A16 = 0.11619 \times 10^{-16}$ r11 : $\epsilon = 0.10000 \times 10$
$A3 = -0.46929 \times 10^{-3}$
$A4 = 0.13287 \times 10^{-3}$
$A5 = -0.12024 \times 10^{-4}$
$A6 = -0.26548 \times 10^{-6}$
$A7 = 0.40398 \times 10^{-7}$
$A8 = 0.41554 \times 10^{-7}$
$A9 = -0.67388 \times 10^{-8}$
$A10 = 0.11910 \times 10^{-9}$
$A11 = 0.30611 \times 10^{-10}$
$A12 = -0.15480 \times 10^{-11}$
$A13 = -0.15678 \times 10^{-14}$

TABLE 3

(3rd Embodiment)

f = 39.1 to 55.0 to 131.0    FNO = 3.62 to 4.94 to 11.24

| | Radius of Curvature | Axial Distance | Refraction Index | Abbe Number |
|---|---|---|---|---|
| r1 | −23.671 | | | |
| | | d1  1.500 | N1  1.80741 | ν1  31.59 |
| r2 | −34.019 | | | |
| | | d2  1.500 | | |
| r3* | 68.124 | | | |
| | | d3  2.000 | N2  1.51823 | ν2  58.96 |
| r4 | −65.497 | | | |
| | | d4  1.500 to 5.730 to 12.128 | | |
| r5* | 19.271 | | | |
| | | d5  2.500 | N3  1.84666 | ν3  23.82 |
| r6* | 15.460 | | | |
| | | d6  4.669 | | |
| r7 | 93.387 | | | |
| | | d7  4.900 | N4  1.51680 | ν4  64.20 |
| r8 | −15.313 | | | |
| | | d8  2.200 | | |
| r9 | ∞ (Aperture stop) | | | |
| | | d9  12.702 to 8.472 to 2.074 | | |
| r10* | −28.022 | | | |
| | | d10  2.397 | N5  1.58340 | ν5  30.23 |
| r11* | −18.622 | | | |
| | | d11  3.186 | | |
| r12 | −11.005 | | | |
| | | d12  1.000 | N6  1.77250 | ν6  49.77 |
| r13 | −65.989 | | | |

Aspherical Coefficients r3 : $\epsilon = 0.10000 \times 10$
$A4 = 0.71213 \times 10^{-5}$
$A6 = 0.99367 \times 10^{-7}$
$A8 = -0.73631 \times 10^{-9}$
$A10 = -0.35881 \times 10^{-11}$
$A12 = 0.42528 \times 10^{-13}$ r5 : $\epsilon = 0.10000 \times 10$
$A4 = -0.10518 \times 10^{-3}$
$A6 = -0.10874 \times 10^{-5}$
$A8 = 0.87759 \times 10^{-9}$
$A10 = 0.65258 \times 10^{-10}$
$A12 = -0.15595 \times 10^{-11}$ r6 : $\epsilon = 0.10000 \times 10$
$A4 = -0.89939 \times 10^{-4}$
$A6 = -0.16247 \times 10^{-5}$
$A8 = 0.23947 \times 10^{-7}$
$A10 = -0.21136 \times 10^{-9}$
$A12 = -0.16251 \times 10^{-11}$
$A14 = 0.65829 \times 10^{-15}$
$A16 = 0.58947 \times 10^{-16}$ r10 : $\epsilon = 0.10000 \times 10$ TABLE 3-continued $A3 = -0.51959 \times 10^{-3}$
$A4 = 0.24968 \times 10^{-3}$
$A5 = -0.40581 \times 10^{-4}$
$A6 = 0.46041 \times 10^{-5}$
$A7 = 0.84834 \times 10^{-7}$
$A8 = -0.44497 \times 10^{-7}$
$A9 = -0.42511 \times 10^{-9}$
$A10 = 0.33876 \times 10^{-9}$
$A11 = 0.79128 \times 10^{-11}$
$A12 = -0.20503 \times 10^{-11}$
$A13 = 0.60303 \times 10^{-15}$
$A14 = 0.64064 \times 10^{-15}$
$A15 = 0.10109 \times 10^{-15}$
$A16 = 0.11619 \times 10^{-16}$ r11 : $\epsilon = 0.10000 \times 10$
$A3 = -0.52687 \times 10^{-3}$
$A4 = 0.13356 \times 10^{-3}$
$A5 = -0.12412 \times 10^{-4}$
$A6 = -0.30313 \times 10^{-6}$
$A7 = 0.38692 \times 10^{-7}$
$A8 = 0.39750 \times 10^{-7}$
$A9 = -0.63909 \times 10^{-8}$
$A10 = 0.14162 \times 10^{-9}$
$A11 = 0.30611 \times 10^{-10}$
$A12 = -0.19509 \times 10^{-11}$
$A13 = -0.15678 \times 10^{-14}$

TABLE 4

(4th Embodiment)

f = 39.3 to 55.0 to 102.1    FNO = 3.62 to 4.97 to 9.02

| | Radius of Curvature | Axial Distance | Refraction Index | Abbe Number |
|---|---|---|---|---|
| r1 | −28.310 | | | |
| | | d1  1.500 | N1  1.80741 | ν1  31.59 |
| r2 | −34.946 | | | |
| | | d2  1.500 | | |
| r3* | 40.812 | | | |
| | | d3  2.000 | N2  1.51680 | ν2  64.20 |
| r4 | 92.711 | | | |
| | | d4  1.500 to 7.505 to 14.647 | | |
| r5* | 22.815 | | | |
| | | d5  2.500 | N3  1.84506 | ν3  23.66 |
| r6* | 18.596 | | | |
| | | d6  3.865 | | |
| r7 | 223.647 | | | |
| | | d7  4.900 | N4  1.51728 | ν4  69.43 |
| r8 | −14.626 | | | |
| | | d8  2.200 | | |
| r9 | ∞ (Aperture stop) | | | |
| | | d9  15.221 to 9.216 to 2.074 | | |
| r10* | −25.824 | | | |
| | | d10  2.733 | N5  1.58340 | ν5  30.23 |
| r11* | −21.854 | | | |
| | | d11  4.371 | | |
| r12 | −14.698 | | | |
| | | d12  1.000 | N6  1.67000 | ν6  57.07 |
| r13 | −116.707 | | | |

Aspherical Coefficients r3 : $\epsilon = 0.10000 \times 10$
$A4 = 0.80817 \times 10^{-5}$
$A6 = 0.47524 \times 10^{-7}$
$A8 = -0.90286 \times 10^{-10}$
$A10 = -0.35563 \times 10^{-11}$
$A12 = 0.40562 \times 10^{-14}$ r5 : $\epsilon = 0.10000 \times 10$
$A4 = -0.12769 \times 10^{-3}$
$A6 = -0.10537 \times 10^{-5}$
$A8 = 0.18690 \times 10^{-8}$
$A10 = 0.71924 \times 10^{-10}$
$A12 = -0.15257 \times 10^{-11}$ r6 : $\epsilon = 0.10000 \times 10$
$A4 = -0.10173 \times 10^{-3}$
$A6 = -0.14103 \times 10^{-5}$ TABLE 4-continued

```
        A8  =  0.24573 × 10⁻⁷
        A10 = -0.21112 × 10⁻⁹
        A12 = -0.16323 × 10⁻¹¹
        A14 =  0.65829 × 10⁻¹⁵
        A16 =  0.58947 × 10⁻¹⁶
r10  :ε =  0.10000 × 10
        A3  = -0.46759 × 10⁻³
        A4  =  0.24869 × 10⁻³
        A5  = -0.41484 × 10⁻⁴
        A6  =  0.44842 × 10⁻⁵
        A7  =  0.75332 × 10⁻⁷
        A8  = -0.45065 × 10⁻⁷
        A9  = -0.42511 × 10⁻⁹
        A10 =  0.33778 × 10⁻⁹
        A11 =  0.79128 × 10⁻¹¹
        A12 = -0.20491 × 10⁻¹¹
        A13 =  0.60303 × 10⁻¹⁵
        A14 =  0.64064 × 10⁻¹⁵
        A15 =  0.10109 × 10⁻¹⁵
        A16 =  0.11619 × 10⁻¹⁶
r11  :ε =  0.10000 × 10
        A3  = -0.41109 × 10⁻³
        A4  =  0.14450 × 10⁻³
        A5  = -0.11422 × 10⁻⁴
        A6  = -0.24553 × 10⁻⁶
        A7  =  0.40954 × 10⁻⁷
        A8  =  0.42801 × 10⁻⁷
        A9  = -0.67605 × 10⁻⁸
        A10 =  0.11349 × 10⁻⁹
        A11 =  0.30611 × 10⁻¹⁰
        A12 = -0.14557 × 10⁻¹¹
        A13 = -0.15678 × 10⁻¹⁴
```

TABLE 5

(5th Embodiment)

f = 39.1 to 55.0 to 116.4    FNO = 3.62 to 4.95 to 10.06

| | Radius of Curvature | | Axial Distance | | Refractive Index | | Abbe Number |
|---|---|---|---|---|---|---|---|
| r1 | −19.626 | | | | | | |
| | | d1 | 1.500 | N1 | 1.80750 | v1 | 35.43 |
| r2 | −32.104 | | | | | | |
| | | d2 | 1.000 | | | | |
| r3* | 143.565 | | | | | | |
| | | d3 | 2.000 | N2 | 1.51680 | v2 | 64.20 |
| r4 | −29.168 | | | | | | |
| | | d4 | 1.500 to 5.212 to 10.311 | | | | |
| r5 | 28.367 | | | | | | |
| | | d5 | 4.247 | N3 | 1.54072 | v3 | 47.22 |
| r6 | 253.548 | | | | | | |
| | | d6 | 0.845 | | | | |
| r7 | −69.892 | | | | | | |
| | | d7 | 3.168 | N4 | 1.80500 | v4 | 40.97 |
| r8 | 121.833 | | | | | | |
| | | d8 | 2.500 | | | | |
| r9 | ∞ (Aperture stop) | | | | | | |
| | | d9 | 2.600 | | | | |
| r10* | −135.135 | | | | | | |
| | | d10 | 2.173 | N5 | 1.58400 | v5 | 31.00 |
| r11 | −82.950 | | | | | | |
| | | d11 | 3.027 | | | | |
| r12 | 67.090 | | | | | | |
| | | d12 | 4.932 | N6 | 1.49310 | v6 | 83.58 |
| r13 | −19.492 | | | | | | |
| | | d13 | 10.886 to 7.174 to 2.074. | | | | |
| r14* | −35.497 | | | | | | |
| | | d14 | 2.335 | N7 | 1.58340 | v7 | 30.23 |
| r15* | −23.461 | | | | | | |
| | | d15 | 3.211 | | | | |
| r16 | −12.629 | | | | | | |
| | | d16 | 1.000 | N8 | 1.77250 | v8 | 49.77 |
| r17 | 829.579 | | | | | | |

TABLE 5-continued (5th Embodiment)

Aspherical Coefficients

```
r3:  ε  =  0.10000 × 10
     A4  =  0.18053 × 10⁻⁵
     A6  =  0.37365 × 10⁻⁶
     A8  = -0.12463 × 10⁻⁷
     A10 =  0.18326 × 10⁻⁹
     A12 = -0.96454 × 10⁻¹²
r10: ε  =  0.10000 × 10
     A4  = -0.38629 × 10⁻⁴
     A6  = -0.65195 × 10⁻⁶
     A8  =  0.98473 × 10⁻⁸
     A10 = -0.62355 × 10⁻¹¹
     A12 = -0.14515 × 10⁻¹²
r14: ε  =  0.10000 × 10
     A3  = -0.49848 × 10⁻³
     A4  =  0.24903 × 10⁻³
     A5  = -0.41162 × 10⁻⁴
     A6  =  0.54818 × 10⁻⁵
     A7  =  0.81797 × 10⁻⁷
     A8  = -0.51475 × 10⁻⁷
     A9  = -0.42511 × 10⁻⁹
     A10 =  0.35170 × 10⁻⁹
     A11 =  0.79128 × 10⁻¹¹
     A12 = -0.18239 × 10⁻¹¹
     A13 =  0.60303 × 10⁻¹⁵
     A14 =  0.64064 × 10⁻¹⁵
     A15 =  0.10109 × 10⁻¹⁵
     A16 =  0.11619 × 10⁻¹⁶
r15: ε  =  0.10000 × 10
     A3  = -0.49448 × 10⁻³
     A4  =  0.13310 × 10⁻³
     A5  = -0.12134 × 10⁻⁴
     A6  = -0.74522 × 10⁻⁶
     A7  =  0.39796 × 10⁻⁷
     A8  =  0.31759 × 10⁻⁷
     A9  = -0.66232 × 10⁻⁸
     A10 =  0.19651 × 10⁻⁹
     A11 =  0.30611 × 10⁻¹⁰
     A12 = -0.16945 × 10⁻¹¹
     A13 = -0.15678 × 10⁻¹⁴
```

TABLE 6

(6th Embodiment)

f = 39.1 to 55.0 to 116.4    FNO = 3.62 to 4.95 to 10.07

| | Radius of Curvature | | Axial Distance | | Refractive Index | | Abbe Number |
|---|---|---|---|---|---|---|---|
| r1 | −16.094 | | | | | | |
| | | d1 | 1.500 | N1 | 1.80750 | v1 | 35.43 |
| r2 | −31.747 | | | | | | |
| | | d2 | 1.000 | | | | |
| r3* | −324.726 | | | | | | |
| | | d3 | 2.000 | N2 | 1.51680 | v2 | 64.20 |
| r4 | −17.540 | | | | | | |
| | | d4 | 1.500 to 5.626 to 11.274 | | | | |
| r5* | 18.400 | | | | | | |
| | | d5 | 2.500 | N3 | 1.84666 | v3 | 23.82 |
| r6* | 16.017 | | | | | | |
| | | d6 | 4.302 | | | | |
| r7 | 210.839 | | | | | | |
| | | d7 | 4.900 | N4 | 1.51680 | v4 | 64.20 |
| r8 | −16.613 | | | | | | |
| | | d8 | 2.200 | | | | |
| r9 | ∞ (Aperture stop) | | | | | | |
| | | d9 | 11.848 to 7.722 to 2.074 | | | | |
| r10* | −42.608 | | | | | | |
| | | d10 | 2.700 | N5 | 1.62060 | v5 | 38.26 |
| r11* | −17.935 | | | | | | |
| | | d11 | 2.302 | | | | |
| r12 | −16.442 | | | | | | |
| | | d12 | 1.500 | N6 | 1.77250 | v6 | 49.77 |

TABLE 6-continued

(6th Embodiment)

| | | | | | | |
|---|---|---|---|---|---|---|
| r13 | −114.675 | | | | | |
| | | d13 | 3.700 | | | |
| r14 | −14.598 | | | | | |
| | | d14 | 1.800 | N7 1.77250 | v7 | 49.77 |
| r15 | −33.373 | | | | | |

Aspherical Coefficients r3: $\epsilon = 0.10000 \times 10$
$A4 = -0.55979 \times 10^{-5}$
$A6 = 0.59183 \times 10^{-7}$
$A8 = -0.12537 \times 10^{-8}$
$A10 = -0.20077 \times 10^{-11}$
$A12 = 0.92220 \times 10^{-13}$
r5: $\epsilon = 0.10000 \times 10$
$A4 = -0.98155 \times 10^{-4}$
$A6 = -0.10422 \times 10^{-5}$
$A8 = 0.10279 \times 10^{-8}$
$A10 = 0.65717 \times 10^{-10}$
$A12 = -0.15580 \times 10^{-11}$
r6: $\epsilon = 0.10000 \times 10$
$A4 = -0.88888 \times 10^{-4}$
$A6 = -0.17112 \times 10^{-5}$
$A8 = 0.23555 \times 10^{-7}$
$A10 = -0.21244 \times 10^{-9}$
$A12 = -0.16260 \times 10^{-11}$
$A14 = 0.65829 \times 10^{-15}$
$A15 = 0.10109 \times 10^{-15}$
$A16 = 0.58947 \times 10^{-16}$
r10: $\epsilon = 0.10000 \times 10$
$A3 = 0.90026 \times 10^{-4}$
$A4 = 0.56438 \times 10^{-5}$
$A5 = 0.23499 \times 10^{-6}$
$A6 = 0.17749 \times 10^{-8}$
$A7 = -0.11063 \times 10^{-8}$
$A8 = -0.18141 \times 10^{-9}$
$A10 = -0.20996 \times 10^{-11}$
$A12 = -0.16717 \times 10^{-13}$
r11: $\epsilon = 0.10000 \times 10$
$A3 = 0.53323 \times 10^{-4}$
$A4 = 0.34115 \times 10^{-6}$
$A5 = -0.20566 \times 10^{-7}$
$A6 = -0.45581 \times 10^{-8}$
$A7 = -0.42636 \times 10^{-9}$
$A8 = -0.23354 \times 10^{-8}$
$A9 = -0.38630 \times 10^{-10}$
$A10 = 0.71526 \times 10^{-11}$
$A12 = 0.27829 \times 10^{-13}$

TABLE 7

(7th Embodiment)

f = 39.1 to 55.0 to 116.4    FNO = 3.62 to 5.01 to 10.39

| | Radius of Curvature | | Axial Distance | Refractive Index | Abbe Number |
|---|---|---|---|---|---|
| r1 | −17.326 | | | | |
| | | d1 | 1.500 | N1  1.83400 | v1  37.05 |
| r2 | −32.356 | | | | |
| | | d2 | 1.000 | | |
| r3 | −84.420 | | | | |
| | | d3 | 2.000 | N2  1.51680 | v2  64.20 |
| r4 | −18.390 | | | | |
| | | d4 | 1.500 to 6.497 to 13.175 | | |
| r5* | 19.799 | | | | |
| | | d5 | 2.500 | N3  1.84666 | v3  23.82 |
| r6* | 17.489 | | | | |
| | | d6 | 4.670 | | |
| r7 | 109.536 | | | | |
| | | d7 | 4.900 | N4  1.51728 | v4  69.43 |
| r8 | −17.288 | | | | |
| | | d8 | 2.200 | | |
| r9 | ∞ (Aperture stop) | | | | |

TABLE 7-continued

(7th Embodiment)

| | | | | | | |
|---|---|---|---|---|---|---|
| | | d9 | 13.749 to 8.752 to 2.074 | | | |
| r10* | −44.226 | | | | | |
| | | d10 | 2.500 | N5 1.58340 | v5 | 30.23 |
| r11* | −23.061 | | | | | |
| | | d11 | 3.960 | | | |
| r12 | −12.620 | | | | | |
| | | d12 | 1.000 | N6 1.80100 | v6 | 46.54 |
| r13 | −101.086 | | | | | |

Aspherical Coefficients r5: $\epsilon = 0.10000 \times 10$
$A4 = -0.96293 \times 10^{-4}$
$A6 = -0.10790 \times 10^{-5}$
$A8 = 0.66237 \times 10^{-9}$
$A10 = 0.62309 \times 10^{-10}$
$A12 = -0.15821 \times 10^{-11}$
r6: $\epsilon = 0.10000 \times 10$
$A4 = -0.85071 \times 10^{-4}$
$A6 = -0.17248 \times 10^{-5}$
$A8 = 0.23658 \times 10^{-7}$
$A10 = -0.21055 \times 10^{-9}$
$A12 = -0.16128 \times 10^{-11}$
$A14 = 0.65829 \times 10^{-15}$
$A16 = 0.58947 \times 10^{-16}$
r10: $\epsilon = 0.10000 \times 10$
$A3 = -0.48004 \times 10^{-3}$
$A4 = 0.24423 \times 10^{-3}$
$A5 = -0.41952 \times 10^{-4}$
$A6 = 0.44991 \times 10^{-5}$
$A7 = 0.78986 \times 10^{-7}$
$A8 = -0.44782 \times 10^{-7}$
$A9 = -0.42511 \times 10^{-9}$
$A10 = 0.33847 \times 10^{-9}$
$A11 = 0.79128 \times 10^{-11}$
$A12 = -0.20360 \times 10^{-11}$
$A13 = 0.60303 \times 10^{-15}$
$A14 = 0.64064 \times 10^{-15}$
$A15 = 0.10109 \times 10^{-15}$
$A16 = 0.11619 \times 10^{-16}$
r11: $\epsilon = 0.10000 \times 10$
$A3 = -0.44519 \times 10^{-3}$
$A4 = 0.13367 \times 10^{-3}$
$A5 = -0.11881 \times 10^{-4}$
$A6 = -0.25451 \times 10^{-6}$
$A7 = 0.40874 \times 10^{-7}$
$A8 = 0.42209 \times 10^{-7}$
$A9 = -0.68161 \times 10^{-8}$
$A10 = 0.11361 \times 10^{-9}$
$A11 = 0.30611 \times 10^{-10}$
$A12 = -0.14290 \times 10^{-11}$
$A13 = -0.15678 \times 10^{-14}$

TABLE 8

(8th Embodiment)

f = 39.3 to 55.0 to 102.1    FNO = 3.62 to 4.6 to 7.35

| | Radius of Curvature | | Axial Distance | Refractive Index | Abbe Number |
|---|---|---|---|---|---|
| r1* | −32.000 | | | | |
| | | d1 | 1.500 | N1  1.80741 | v1  31.59 |
| r2 | −41.366 | | | | |
| | | d2 | 0.500 | | |
| r3* | 22.628 | | | | |
| | | d3 | 2.000 | N2  1.51728 | v2  69.43 |
| r4 | 126.263 | | | | |
| | | d4 | 1.500 to 6.537 to 13.177 | | |
| r5* | 19.795 | | | | |
| | | d5 | 2.500 | N3  1.84506 | v3  23.66 |
| r6* | 14.388 | | | | |
| | | d6 | 4.799 | | |
| r7 | −503.890 | | | | |

TABLE 8-continued (8th Embodiment)

| | | d7 | 4.900 | N4 | 1.52307 | v4 | 58.57 |
|---|---|---|---|---|---|---|---|
| r8 | −13.707 | | | | | | |
| | | d8 | 2.200 | | | | |
| r9 | ∞ (Aperture stop) | | | | | | |
| | | d9 | 13.751 to 8.714 to 2.074 | | | | |
| r10* | −20.339 | | | | | | |
| | | d10 | 2.758 | N5 | 1.58340 | v5 | 30.23 |
| r11* | −21.454 | | | | | | |
| | | d11 | 1.791 | | | | |
| r12 | −15.248 | | | | | | |
| | | d12 | 1.000 | N6 | 1.61800 | v6 | 63.39 |
| r13 | −797.932 | | | | | | |

| Aspherical Coefficients |
|---|
| r1: $\epsilon = 0.10000 \times 10$ |
| $A4 = 0.71231 \times 10^{-7}$ |
| $A6 = 0.52195 \times 10^{-7}$ |
| $A8 = -0.25359 \times 10^{-9}$ |
| $A10 = -0.39813 \times 10^{-12}$ |
| $A12 = 0.17476 \times 10^{-14}$ |
| r3: $\epsilon = 0.10000 \times 10$ |
| $A4 = 0.35042 \times 10^{-5}$ |
| $A6 = 0.23103 \times 10^{-7}$ |
| $A8 = -0.67780 \times 10^{-9}$ |
| $A10 = -0.15550 \times 10^{-11}$ |
| $A12 = 0.74233 \times 10^{-13}$ |
| r5: $\epsilon = 0.10000 \times 10$ |
| $A4 = -0.12239 \times 10^{-3}$ |
| $A6 = -0.90107 \times 10^{-6}$ |
| $A8 = 0.11554 \times 10^{-8}$ |
| $A10 = 0.64400 \times 10^{-10}$ |
| $A12 = -0.15674 \times 10^{-11}$ |
| r6: $\epsilon = 0.10000 \times 10$ |
| $A4 = -0.10076 \times 10^{-3}$ |
| $A6 = -0.14758 \times 10^{-5}$ |
| $A8 = 0.24553 \times 10^{-7}$ |
| $A10 = -0.20994 \times 10^{-9}$ |
| $A12 = -0.16222 \times 10^{-11}$ |
| $A14 = 0.65829 \times 10^{-15}$ |
| $A15 = 0.58947 \times 10^{-16}$ |
| r10: $\epsilon = 0.10000 \times 10$ |
| $A3 = -0.42559 \times 10^{-3}$ |
| $A4 = 0.24016 \times 10^{-3}$ |
| $A5 = -0.41374 \times 10^{-4}$ |
| $A6 = 0.44519 \times 10^{-5}$ |
| $A7 = 0.73797 \times 10^{-7}$ |
| $A8 = -0.44807 \times 10^{-7}$ |
| $A9 = -0.42511 \times 10^{-9}$ |
| $A10 = 0.34232 \times 10^{-9}$ |
| $A11 = 0.79128 \times 10^{-11}$ |
| $A12 = -0.19916 \times 10^{-11}$ |
| $A13 = 0.60303 \times 10^{-15}$ |
| $A14 = 0.64064 \times 10^{-15}$ |
| $A15 = 0.10109 \times 10^{-15}$ |
| $A16 = 0.11619 \times 10^{-16}$ |
| r11: $\epsilon = 0.10000 \times 10$ |
| $A3 = -0.40645 \times 10^{-3}$ |
| $A4 = 0.13873 \times 10^{-3}$ |
| $A5 = -0.12074 \times 10^{-4}$ |
| $A6 = -0.24438 \times 10^{-6}$ |
| $A7 = 0.39639 \times 10^{-7}$ |
| $A8 = 0.40410 \times 10^{-7}$ |
| $A9 = -0.66676 \times 10^{-8}$ |
| $A10 = 0.11883 \times 10^{-9}$ |
| $A11 = 0.30611 \times 10^{-10}$ |
| $A12 = -0.13772 \times 10^{-11}$ |
| $A13 = -0.15678 \times 10^{-14}$ |

TABLE 9

| | $\frac{f1}{fW}$ | $\frac{f1}{f2}$ |
|---|---|---|
| 1st embodiment | 2.60 | 2.76 |
| 2nd embodiment | 3.20 | 3.46 |
| 3rd embodiment | 3.93 | 4.77 |
| 4th embodiment | 10.2 | 10.3 |
| 5th embodiment | 3.41 | 4.26 |
| 6th embodiment | 3.65 | 4.08 |
| 7th embodiment | 8.53 | 10.03 |
| 8th embodiment | 1.82 | 1.88 |

TABLE 10

| | $\frac{|r1|}{f1}$ | $\frac{r1 + r2}{r1 - r2}$ |
|---|---|---|
| 1st embodiment | 0.240 | 7.58 |
| 2nd embodiment | 0.139 | 3.55 |
| 3rd embodiment | 0.150 | 5.59 |
| 4th embodiment | 0.085 | 9.52 |
| 5th embodiment | 0.147 | 4.14 |
| 6th embodiment | 0.113 | 3.06 |
| 7th embodiment | 0.052 | 3.30 |
| 8th embodiment | 0.448 | 7.81 |

TABLE 11

| | $\frac{f1 \cdot fT}{fW}$ | $\frac{D1}{f1}$ |
|---|---|---|
| 1st embodiment | 273 | 0.039 |
| 2nd embodiment | 384 | 0.036 |
| 3rd embodiment | 531 | 0.033 |
| 4th embodiment | 1071 | 0.015 |
| 5th embodiment | 409 | 0.034 |
| 6th embodiment | 438 | 0.031 |
| 7th embodiment | 1022 | 0.014 |
| 8th embodiment | 191 | 0.056 |

What is claimed is:

1. A high-magnification zoom lens system, comprising, from the object side to the image side:

a positive first lens unit consisting of two lens elements;

a positive second lens unit comprising at least two lens elements and having a first variable air space, which varies during a zooming operation, between the first and second lens units; and a negative third lens unit comprising at least two lens elements and having a second variable air space, which varies during a zooming operation, between the second and third lens units;

wherein the zoom lens system fulfills the following condition:

$$2.5 < \frac{f1}{fW} < 12$$

$$0.8 < \frac{f1}{fT} < 1.3$$

wherein f1 represents a focal length of the positive first lens unit;

fT represents the focal length of the entire lens system at the longest focal length condition; and fW represents the focal length of the entire lens system at the shortest focal length condition.

2. A high-magnification zoom lens system as claimed in claim 1, wherein the first air space increases while the second air space decreases at the zooming operation from the shortest focal length condition to the longest focal length condition, and the zoom lens system fulfills the following condition:

$$2.0 < \frac{f1}{f2} < 12$$

wherein f2 represents a focal length of the positive second lens unit.

3. A high-magnification zoom lens system as claimed in claim 1, wherein the first positive lens unit consists of from the object side to the image side a negative lens element and a positive lens element, the second positive lens unit consists of from the object side to the image side a negative lens element and a positive lens element, the negative third lens unit consists of a positive lens element and a negative lens element, and at least one aspherical surface is in the second or third lens unit.

4. A high-magnification zoom lens system as claimed in claim 1, wherein the zoom lens system further fulfills the following condition:

$$\tan\omega > 0.72$$

wherein ω represents a half angle of view of the entire lens system at the shortest focal length condition.

5. A high-magnification zoom lens system as claimed in claim 1, wherein the zoom lens system fulfills the following condition:

$$3.0 < \frac{f1}{fW} < 12$$

6. A high-magnification zoom lens system as claimed in claim 1, wherein the zoom lens system fulfills the following condition:

$$2.2 < \frac{f1}{y'} < 7.7$$

wherein y' represents a maximum image height.

7. A high-magnification zoom lens system comprising from the object side to the image side:

a positive first lens unit having a negative lens element, whose object side surface has a stronger negative refractive power than an image side surface, on the object side end;

a positive second lens unit having a variable air space, which varies during a zooming operation, between the first and second lens units; and a negative third lens unit having a variable air space, which varies during a zooming operation, between the second and third lens units wherein the zoom lens system fulfills the following condition:

$$0.03 < \frac{|r1|}{f1} < 0.50$$

wherein:

r1 represents a radius of curvature of the object side surface of the negative lens element; and f1 represents a focal length of the positive first lens unit.

* * * * *